US010943500B2

(12) United States Patent
Matsumoto et al.

(10) Patent No.: US 10,943,500 B2
(45) Date of Patent: Mar. 9, 2021

(54) METHOD OF ONLINE TEST AND ONLINE TEST SERVER FOR EVALUATING IDEA CREATING SKILLS

(71) Applicant: VISITS TECHNOLOGIES INC., Tokyo (JP)

(72) Inventors: Masaru Matsumoto, Tokyo (JP); Minoru Kuriyama, Tokyo (JP); Ryoji Minami, Tokyo (JP)

(73) Assignee: Visits Technologies Inc., Tokyo (JP)

( * ) Notice: Subject to any disclaimer, the term of this patent is extended or adjusted under 35 U.S.C. 154(b) by 332 days.

(21) Appl. No.: 15/764,291

(22) PCT Filed: Feb. 8, 2017

(86) PCT No.: PCT/JP2017/004603
§ 371 (c)(1),
(2) Date: Mar. 28, 2018

(87) PCT Pub. No.: WO2017/145765
PCT Pub. Date: Aug. 31, 2017

(65) Prior Publication Data

US 2018/0286265 A1 Oct. 4, 2018

(30) Foreign Application Priority Data

Feb. 22, 2016 (JP) ............................ JP2016-031332

(51) Int. Cl.
*G09B 7/07* (2006.01)
*G09B 19/00* (2006.01)
(Continued)

(52) U.S. Cl.
CPC ............... *G09B 7/07* (2013.01); *G06F 7/588* (2013.01); *G06F 16/24578* (2019.01);
(Continued)

(58) Field of Classification Search
CPC ... G09B 5/00; G09B 7/00; G09B 7/07; G09B 5/08; G09B 7/02; G06F 17/18;
(Continued)

(56) References Cited

U.S. PATENT DOCUMENTS

| | | | | |
|---|---|---|---|---|
| 8,755,737 B1 * | 6/2014 | Galen | ...................... | G09B 7/08 434/352 |
| 2004/0018479 A1 * | 1/2004 | Pritchard | ................ | G09B 7/02 434/350 |

(Continued)

FOREIGN PATENT DOCUMENTS

| | | |
|---|---|---|
| JP | 2002-062795 A | 2/2002 |
| JP | 2002-092266 A | 3/2002 |

(Continued)

OTHER PUBLICATIONS

European Search Report for EP Application No. 17756206.3 (PCT/JP2017/004603), dated Aug. 3, 2018.

(Continued)

*Primary Examiner* — Robert J Utama
(74) *Attorney, Agent, or Firm* — Martin & Ferraro, LLP

(57) ABSTRACT

Provided are a method of on online test and an online test server for simply evaluating idea creation skills. A test is conducted online, in which a number of examinees are prompted to repeat a task of choosing a situation setting involving 5W1H from a plurality of options describing ideas corresponding to the situation setting as many times as possible within a time limit, and total scores are calculated for answers of the examinees by assigning weight according to predetermined criteria, thereby evaluating an innovation ability, such as an ability to create a lot of valuable ideas, an ability to create a variety of valuable ideas, or an ability to create rare valuable ideas.

14 Claims, 17 Drawing Sheets

(51) Int. Cl.

| | |
|---|---|
| ***G09B 7/073*** | (2006.01) |
| ***G09B 7/02*** | (2006.01) |
| ***G06F 16/2457*** | (2019.01) |
| ***G06Q 10/10*** | (2012.01) |
| ***G06Q 10/06*** | (2012.01) |
| ***G06Q 50/00*** | (2012.01) |
| ***G06F 7/58*** | (2006.01) |
| ***G06F 17/18*** | (2006.01) |
| *G06Q 50/20* | (2012.01) |

(52) U.S. Cl.
CPC ....... *G06F 17/18* (2013.01); *G06Q 10/06398* (2013.01); *G06Q 10/101* (2013.01); *G06Q 50/01* (2013.01); *G09B 19/00* (2013.01); *G06Q 50/20* (2013.01); *G09B 7/02* (2013.01); *G09B 7/073* (2013.01)

(58) Field of Classification Search
CPC ...... G06Q 50/01; G06Q 50/20; G06Q 50/205; G06Q 50/2053; G06Q 50/2057; G06Q 10/06398
See application file for complete search history.

(56) References Cited

U.S. PATENT DOCUMENTS

| | | | | |
|---|---|---|---|---|
| 2011/0097692 | A1* | 4/2011 | Homan .................. | G09B 19/18 434/129 |
| 2012/0058459 | A1 | 3/2012 | Obeid | |
| 2012/0288844 | A1* | 11/2012 | Anand ..................... | G09B 7/08 434/353 |
| 2015/0006261 | A1 | 1/2015 | Gutman et al. | |
| 2015/0358681 | A1 | 12/2015 | Gaston | |

FOREIGN PATENT DOCUMENTS

| | | |
|---|---|---|
| JP | 2007-257330 A | 10/2007 |
| WO | WO 2011/060480 | 5/2011 |

OTHER PUBLICATIONS

International Search Report for PCT/JP2017/004603, dated May 9, 2017.

* cited by examiner

[Fig. 1]
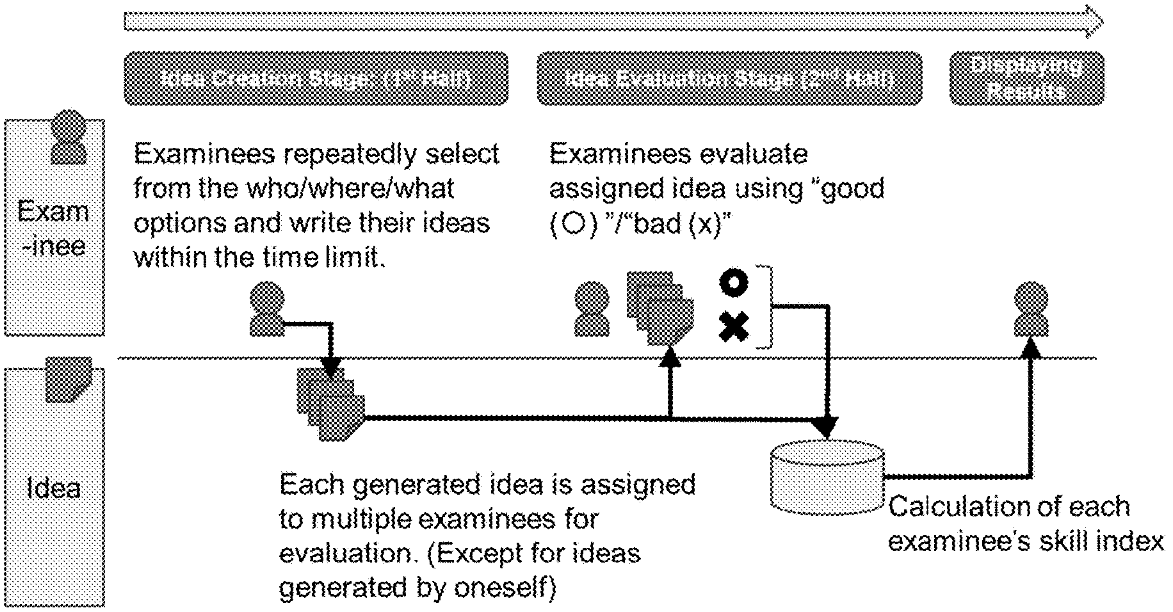
[Fig. 2]
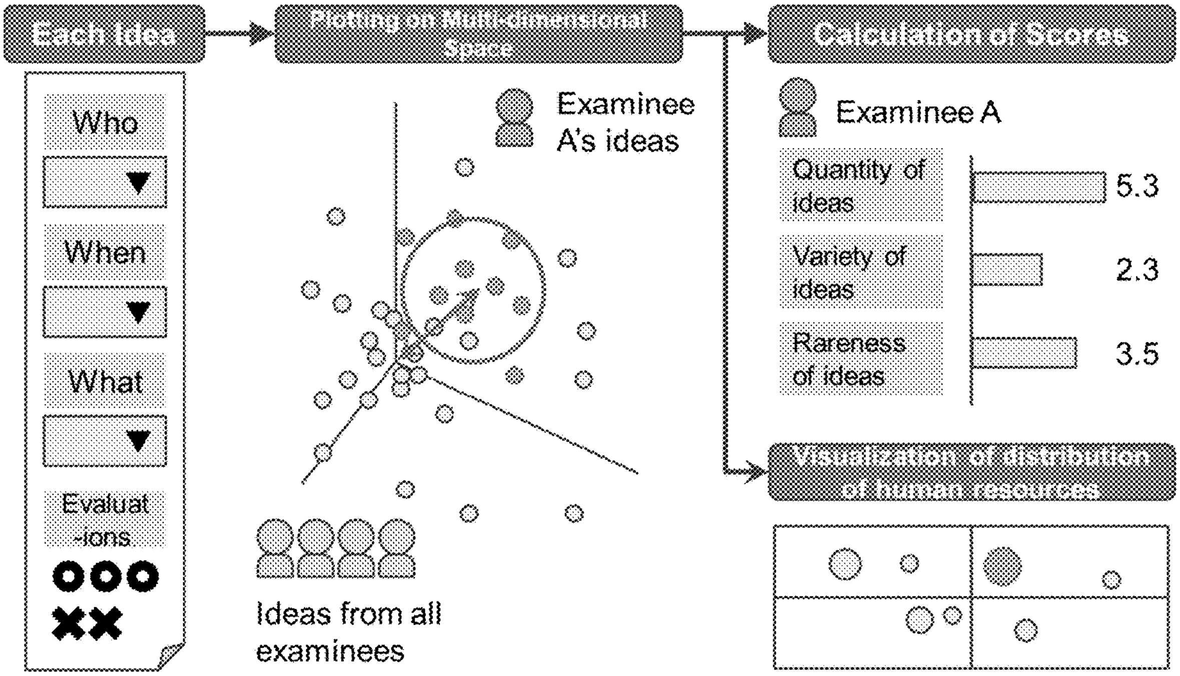

[Fig. 3]
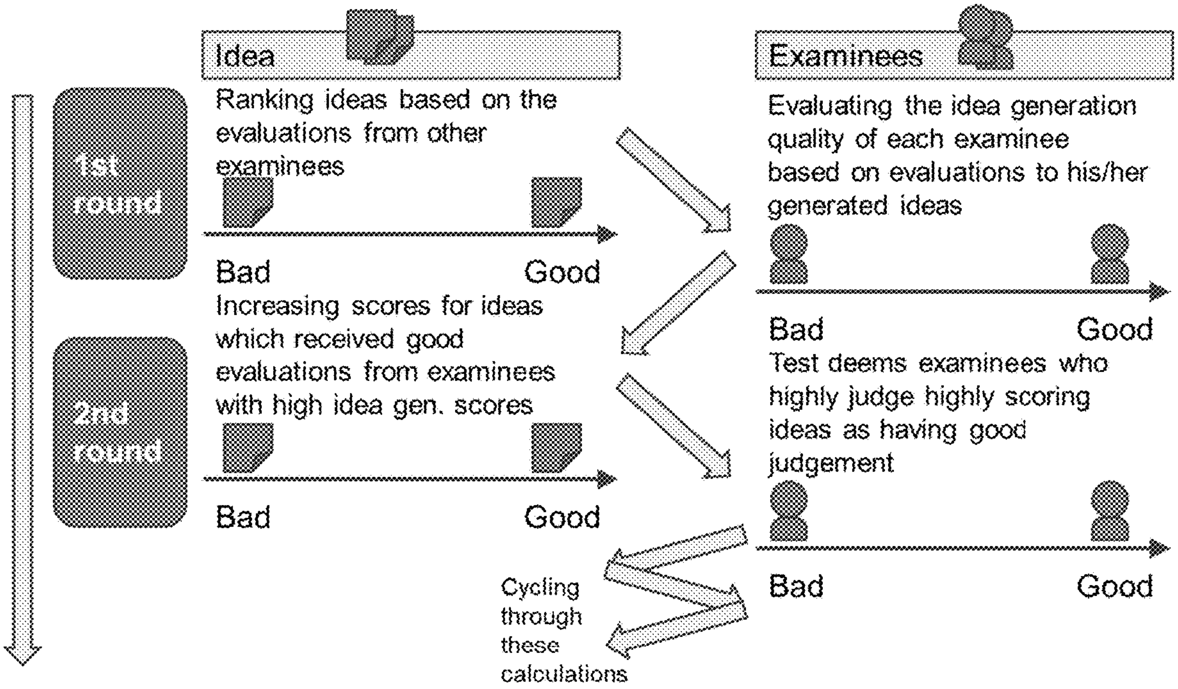
[Fig. 4]
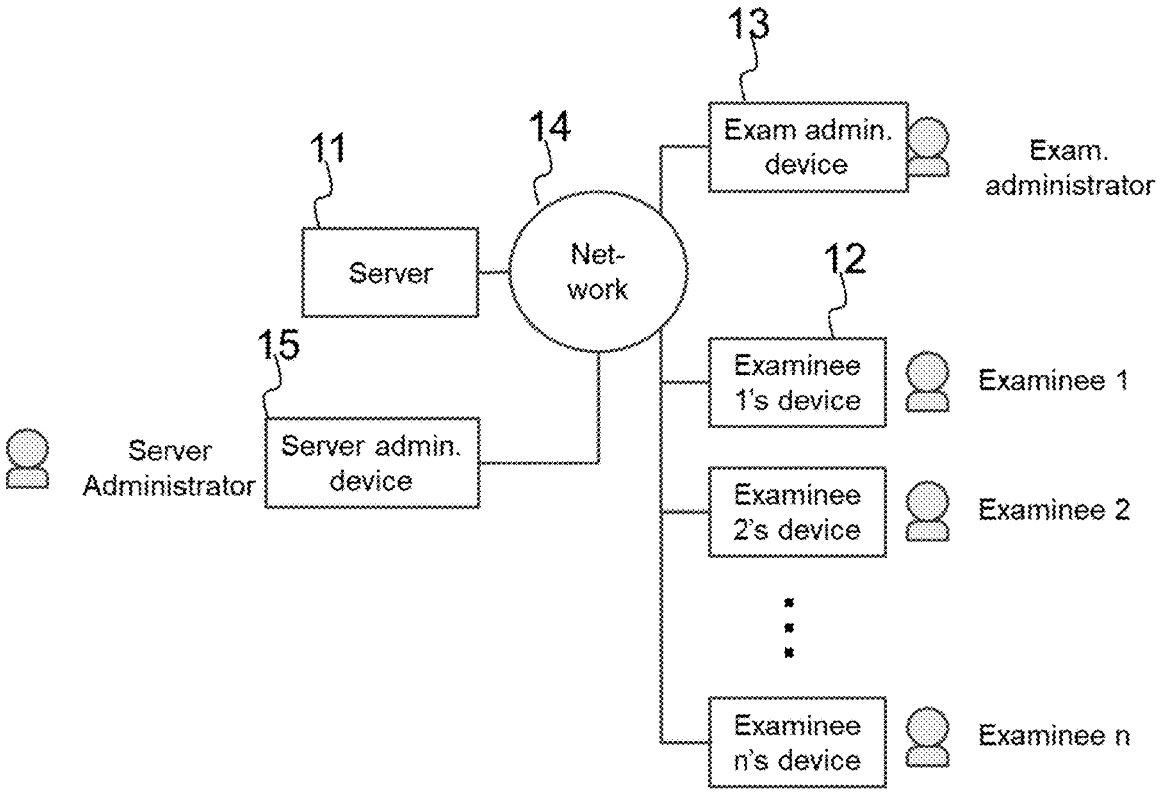

[Fig. 5]
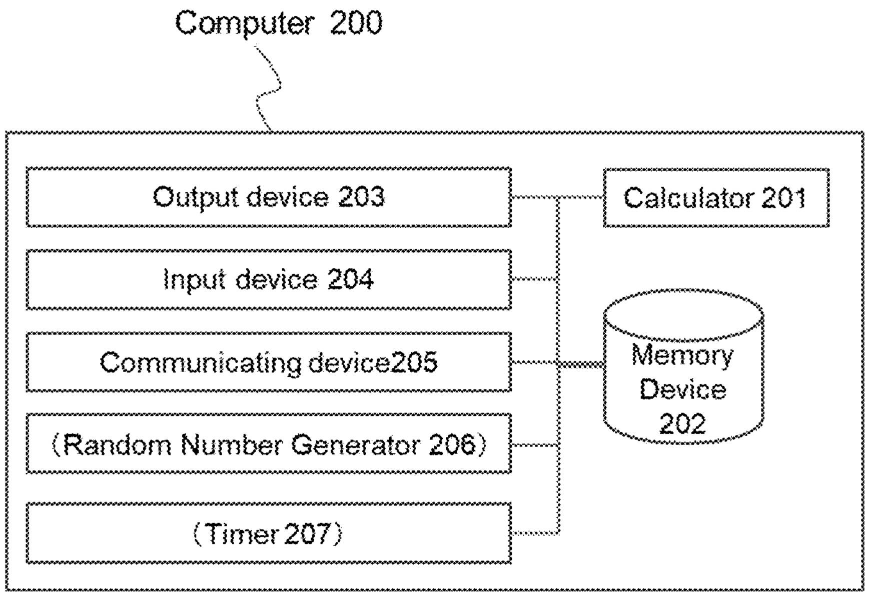

[Fig. 6]
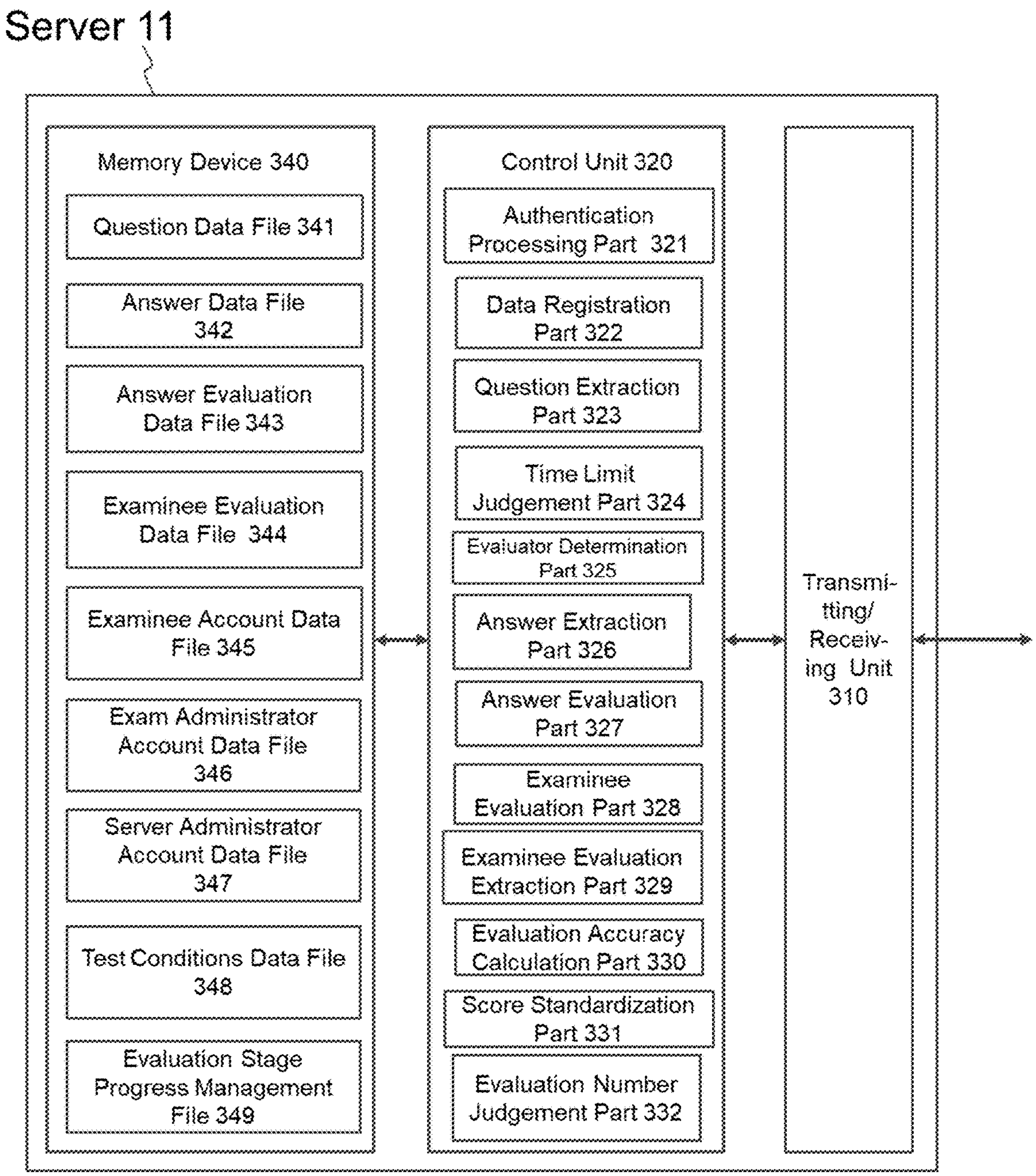

[Fig. 7]

Question Data File 341

| Field | Type | Content |
|---|---|---|
| Setting item | int | About 5 options for each of 4 elements, therefore making around 20 options. |
| Question content | text | |
| Date of renewal | date | |
| | | |
| | | |

[Fig. 8]

Answer Data File 342

| Field | Type | Content |
|---|---|---|
| Idea Answer ID | int | primary key |
| Examinee ID | int | |
| Element 1 "Who" | int | Content received from examinee |
| Element 2 "When" | int | Content received from examinee |
| Element 3 "Where" | int | Content received from examinee |
| Elementr 4 "What" | int | Content received from examinee |
| "Needs" section | text | Content received from examinee |
| "Idea" section | Text | Content received from examinee |
| Calculated Score 1 | float | |
| Calculated Score 2 (After 1st adjustment) | float | |
| Calculated Score 3 (After 2nd adjustment) | float | |
| Status | int | |
| Evaluator's examinee ID | int | |

[Fig. 9 ]

Answer Evaluation Data File 343

| Field | Type | Content |
|---|---|---|
| Answer Evaluation ID | int | primary key |
| Idea Answer ID | int | ID of the evaluated answer content |
| Evaluator's examinee ID | int | Examinee ID of the examinee who sent the evaluation |
| Idea answer examinee ID | int | Examinee ID of the examinee who sent the answer content |
| Answer Evaluation | int | Score based on sent "○" or "×" (Coded as 1 or 0) |
| Status | int | Progress such as "evaluation not done", "evaluation completed" etc. |
| | | |

[Fig. 10]

Examinee Evaluation Data File 344

| Field | Type | Content |
|---|---|---|
| Examinee ID | int | primary key |
| Individual ID | int | |
| Registration Date/time | date | |
| Opening date/time for the first half test | date | |
| Closing date/time for the first half test | date | |
| Opening date/time for the second half test | date | |
| Closing date/time for the second half test | date | |
| Status | int | |
| Score Calculation Result 1 | float | This area stores the total scores for idea creation skills, the evaluation skills as an idea evaluator, and the like. This area is also able to store the total scores under various score categories (quantity of ideas, variety of ideas, rareness of ideas etc.) |
| Score Calculation Result 2 | float | |
| Score Calculation Result 3 | float | |
| Score Calculation Result 4 | float | |
| Score Calculation Result 5 | float | |

[Fig. 11]

Examinee Account Data File 345

| Field | Type | Content |
|---|---|---|
| Individual ID | int | primary key |
| Examinee ID | int | |
| Organization ID | int | ID of the organization which the examinee belongs to. |
| Internal ID in Organization | int | Employee ID No. etc. |
| Name | text | |
| Name *Kana* reading | text | |
| Email address | text | |
| Department 1 | text | High-level grouping |
| Department 2 | text | Middle-level grouping |
| Department 3 | text | Low-level grouping |
| Date of Birth | date | |
| Postal Code | int | * When individuals register for test |
| Address | text | * When individuals register for test |
| Date/time of Account Creation | date | |
| Login password | crypt | |
| Status | int | "Test-in-progress" etc. |
| | | |

[Fig. 12]

Exam Administrator Account Data File 346

| Field | Type | Content |
|---|---|---|
| Organization ID | int | primary key |
| Organization Name | text | |
| Organization Name *Kana* reading | text | |
| Postal Code | int | |
| Address | text | |
| Name of Person-in-Charge | text | |
| Name of Person-in-Charge *Kana* reading | text | |
| Department-in-Charge | text | |
| Tel. No. of Person-in-Charge | int | |
| E-mail address of Person-in-Charge | text | |
| Date/time of Account Registration | date | |
| Login Password | crypt | |
| Status | int | "Account Closed" etc. |
| | | |

[Fig. 13]

Server Administrator Account Data File 347

| Field | Type | Content |
|---|---|---|
| Server Administrator ID | int | primary key |
| Password | crypt | |
| Date of Account Creation | date | |
| Level of Authorization | int | |
| Remarks | text | |
| | | |
| | | |
| | | |
| | | |
| | | |
| | | |
| | | |
| | | |
| | | |

[Fig. 14]

Test Condition Data File 348

| Field | Type | Content |
|---|---|---|
| Test Condition ID | int | primary key |
| | | |
| Closing date/time for the first half test | date | |
| Duration of the first half test | time | |
| Possibility of pausing / resuming test | bool | |
| Opening date/time for the second half test | date | |
| Closing date/time for the second half test | date | |
| Number of evaluators per idea in the second half test | int | |
| Boundaries for External Access | int | |
| | | |
| | | |
| | | |
| | | |
| | | |
| | | |

[Fig. 15]

Second Half Test Progress Management Data File 349

| Field | Type | Content |
|---|---|---|
| Evaluator's Examinee ID | int | primary key |
| Idea Answer ID to Evaluate | int | |
| Necessary Number of Evaluations | int | |
| Number of Completed Evaluations | Int | |
| | | |
| | | |

[Fig. 16]
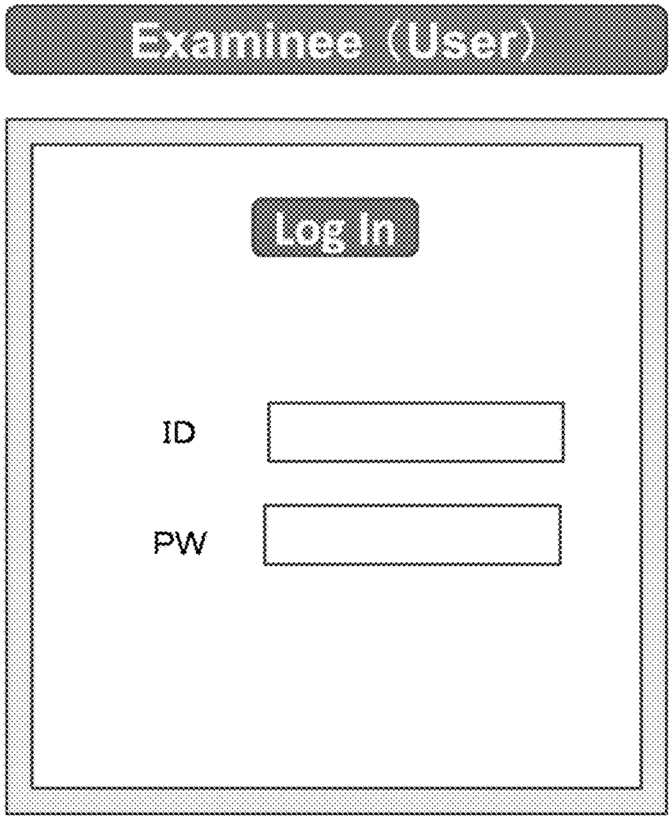
[Fig. 17]
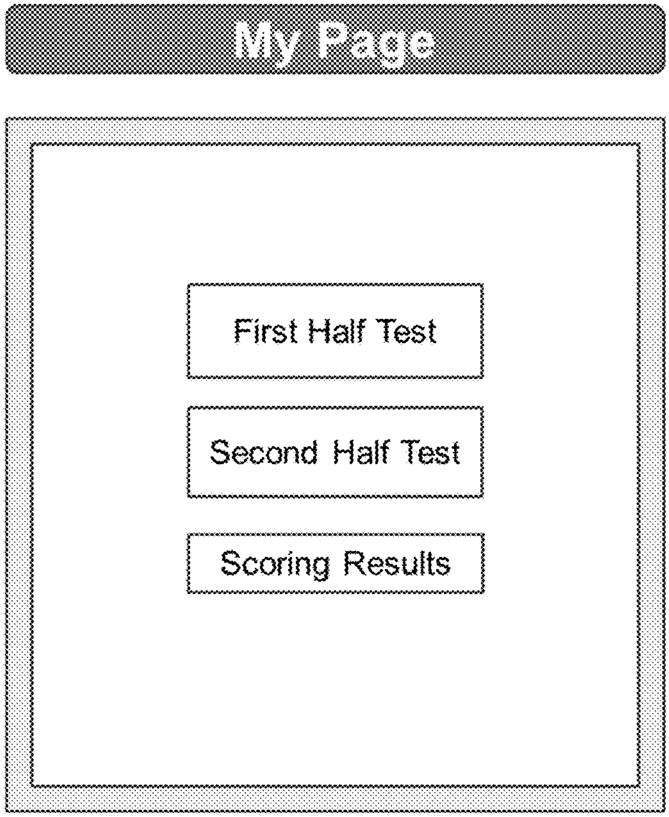

[Fig. 18]
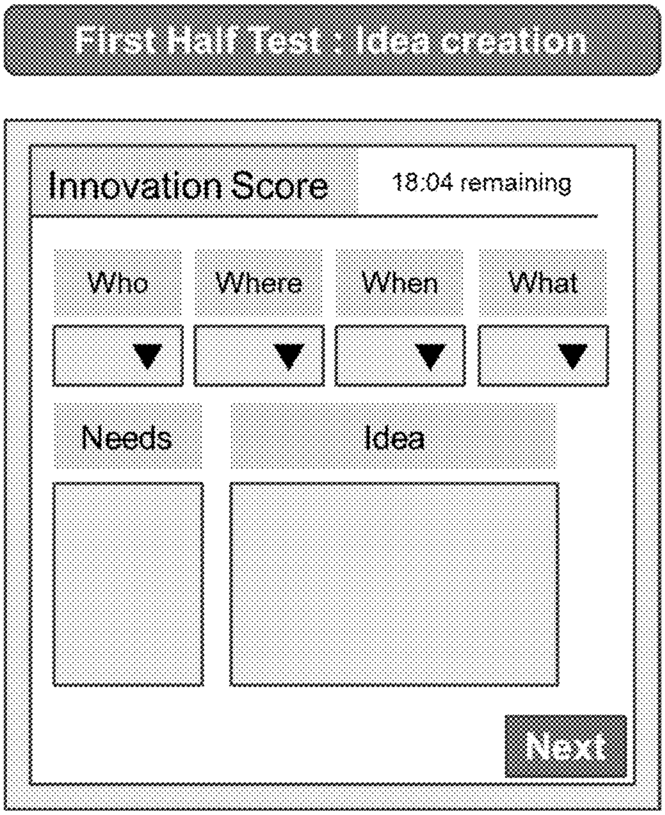
[Fig. 19]
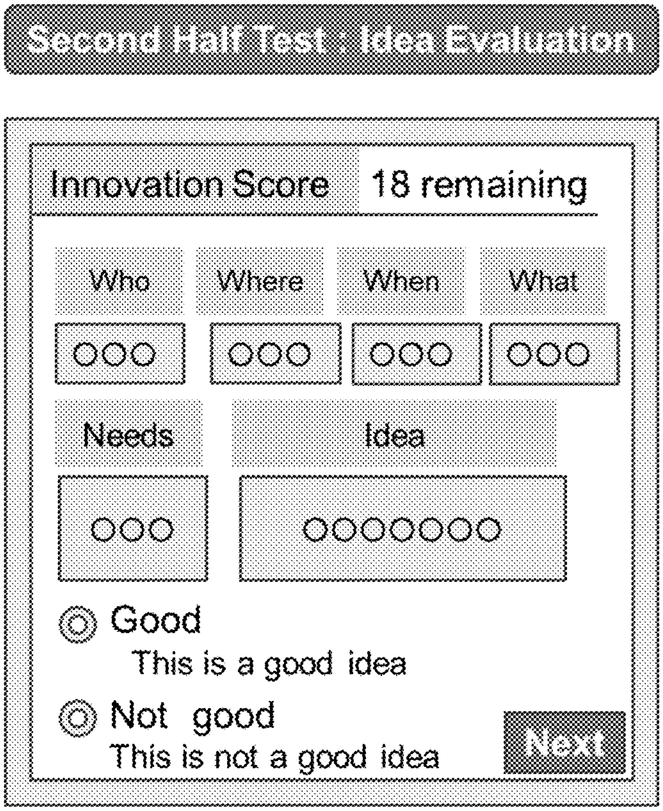

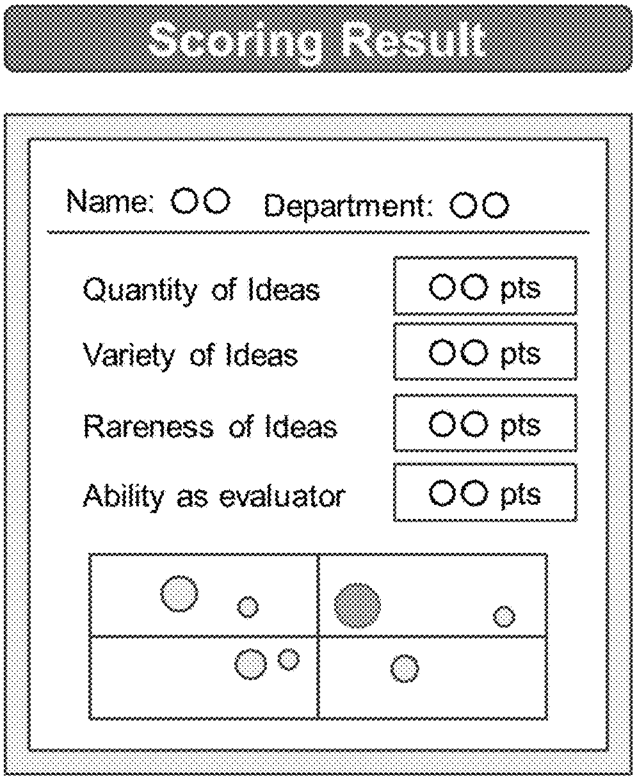

[Fig. 20]

Scoring Result

Name: ○○   Department: ○○

Quantity of Ideas   ○○ pts

Variety of Ideas   ○○ pts

Rareness of Ideas   ○○ pts

Ability as evaluator   ○○ pts

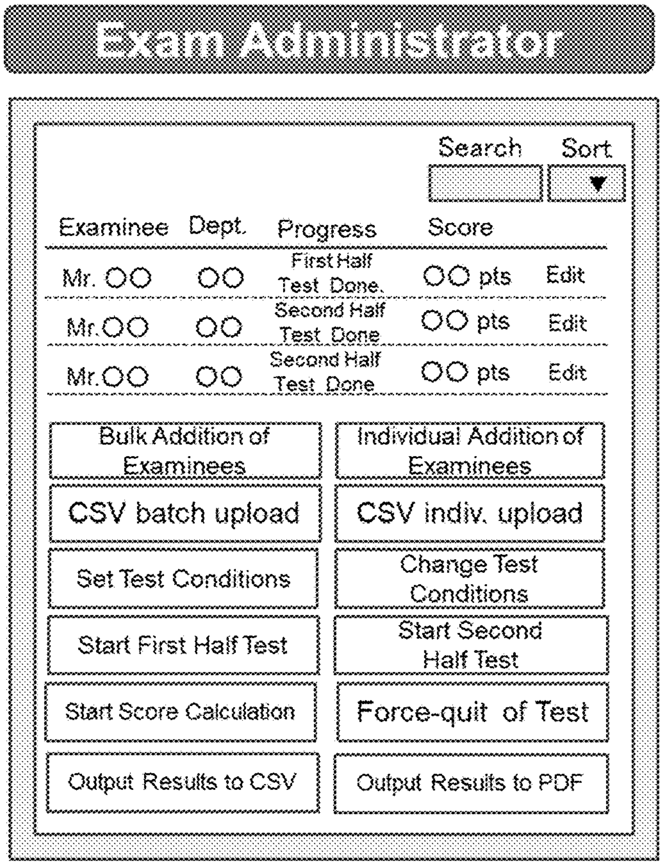

[Fig. 21]

Exam Administrator

Search    Sort

| Examinee | Dept. | Progress | Score | |
|---|---|---|---|---|
| Mr. ○○ | ○○ | First Half Test Done. | ○○ pts | Edit |
| Mr. ○○ | ○○ | Second Half Test Done | ○○ pts | Edit |
| Mr. ○○ | ○○ | Second Half Test Done | ○○ pts | Edit |

| Bulk Addition of Examinees | Individual Addition of Examinees |
|---|---|
| CSV batch upload | CSV indiv. upload |
| Set Test Conditions | Change Test Conditions |
| Start First Half Test | Start Second Half Test |
| Start Score Calculation | Force-quit of Test |
| Output Results to CSV | Output Results to PDF |

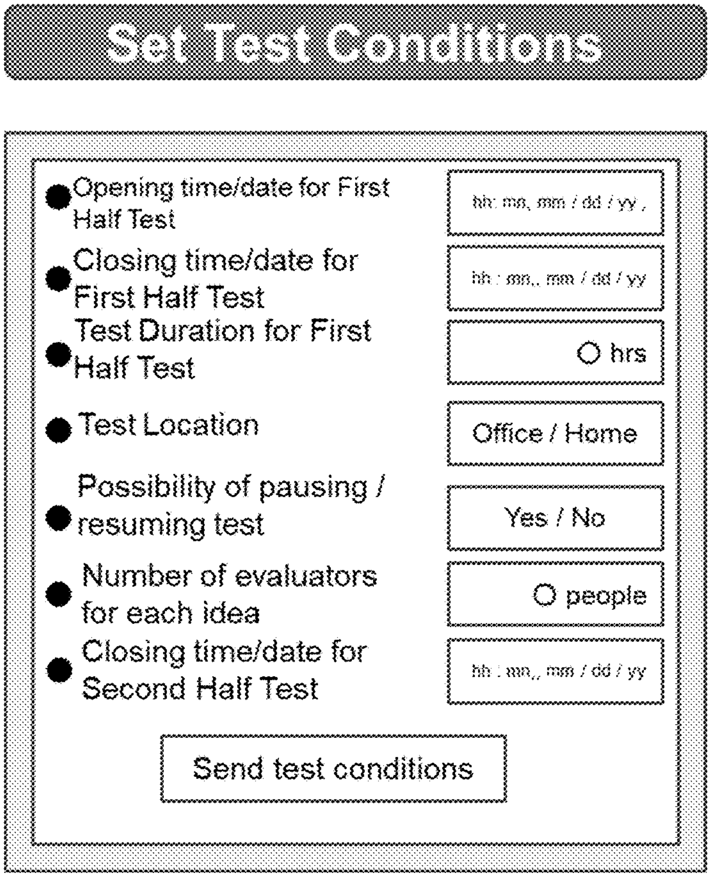

[Fig. 22]

Set Test Conditions

- Opening time/date for First Half Test — hh : mn, mm / dd / yy
- Closing time/date for First Half Test — hh : mn, mm / dd / yy
- Test Duration for First Half Test — ○ hrs
- Test Location — Office / Home
- Possibility of pausing / resuming test — Yes / No
- Number of evaluators for each idea — ○ people
- Closing time/date for Second Half Test — hh : mn, mm / dd / yy Send test conditions

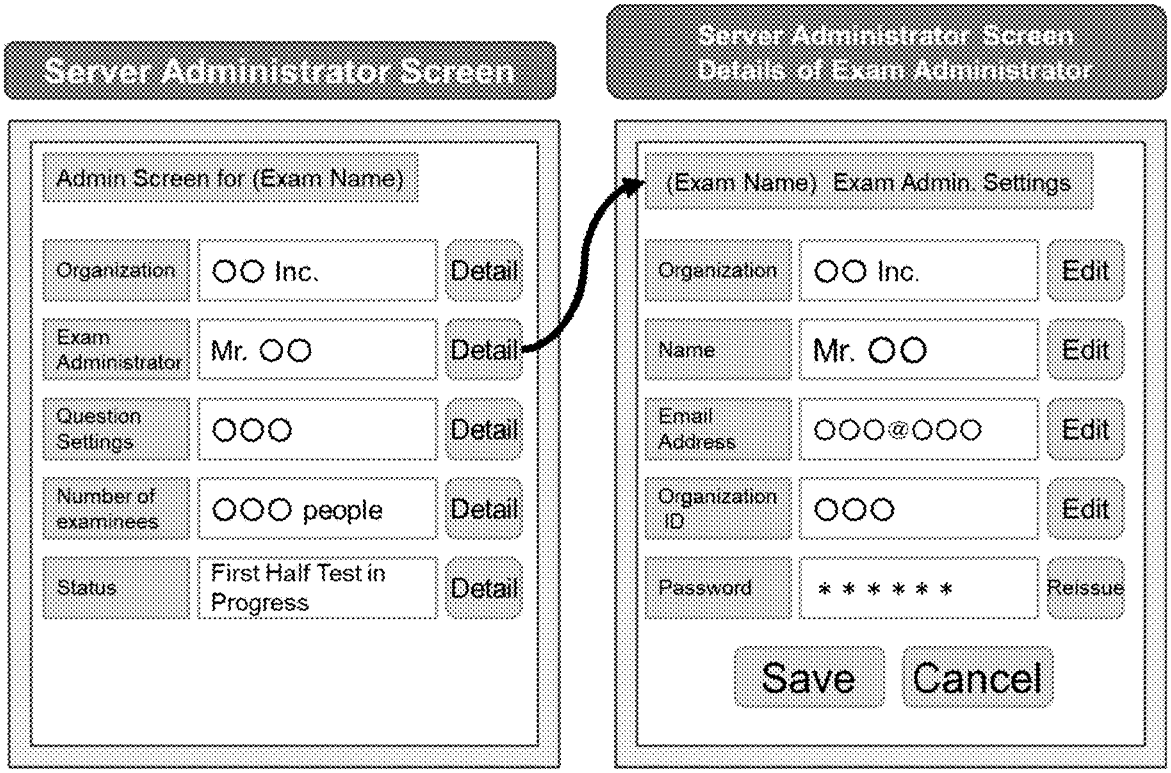

[Fig. 23]

Server Administrator Screen

Admin Screen for (Exam Name)

| | | |
|---|---|---|
| Organization | OO Inc. | Detail |
| Exam Administrator | Mr. OO | Detail |
| Question Settings | OOO | Detail |
| Number of examinees | OOO people | Detail |
| Status | First Half Test in Progress | Detail |

Server Administrator Screen
Details of Exam Administrator (Exam Name) Exam Admin. Settings

| | | |
|---|---|---|
| Organization | OO Inc. | Edit |
| Name | Mr. OO | Edit |
| Email Address | OOO@OOO | Edit |
| Organization ID | OOO | Edit |
| Password | ****** | Reissue |

Save   Cancel

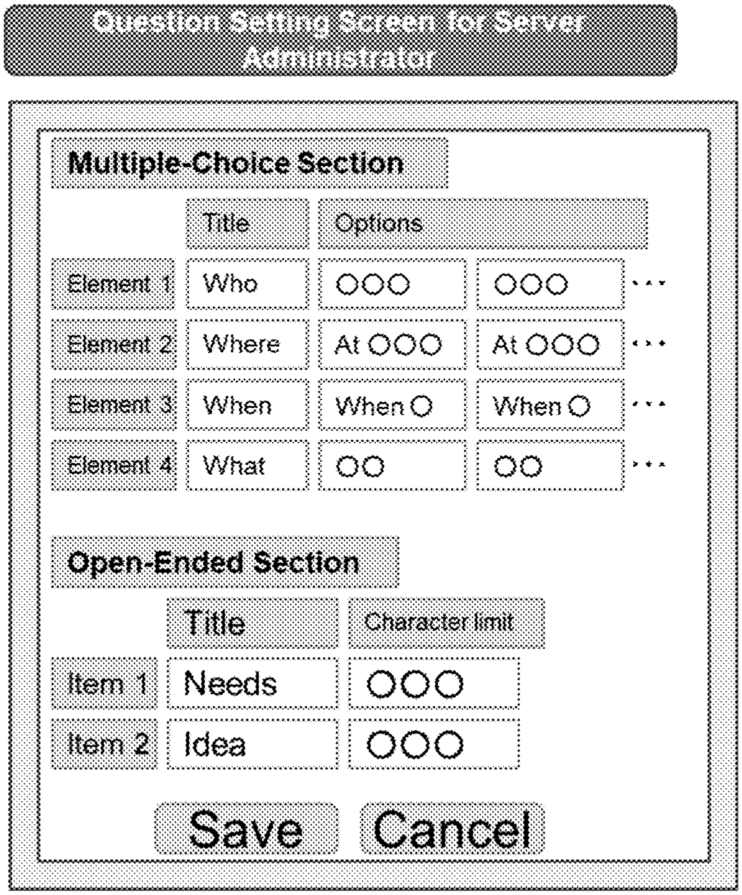
[Fig. 24]
Question Setting Screen for Server Administrator
Multiple-Choice Section
| | Title | Options | | |
|---|---|---|---|---|
| Element 1 | Who | ○○○ | ○○○ | ... |
| Element 2 | Where | At ○○○ | At ○○○ | ... |
| Element 3 | When | When ○ | When ○ | ... |
| Element 4 | What | ○○ | ○○ | ... |
Open-Ended Section
| | Title | Character limit |
|---|---|---|
| Item 1 | Needs | ○○○ |
| Item 2 | Idea | ○○○ |
Save   Cancel

[Fig. 25]
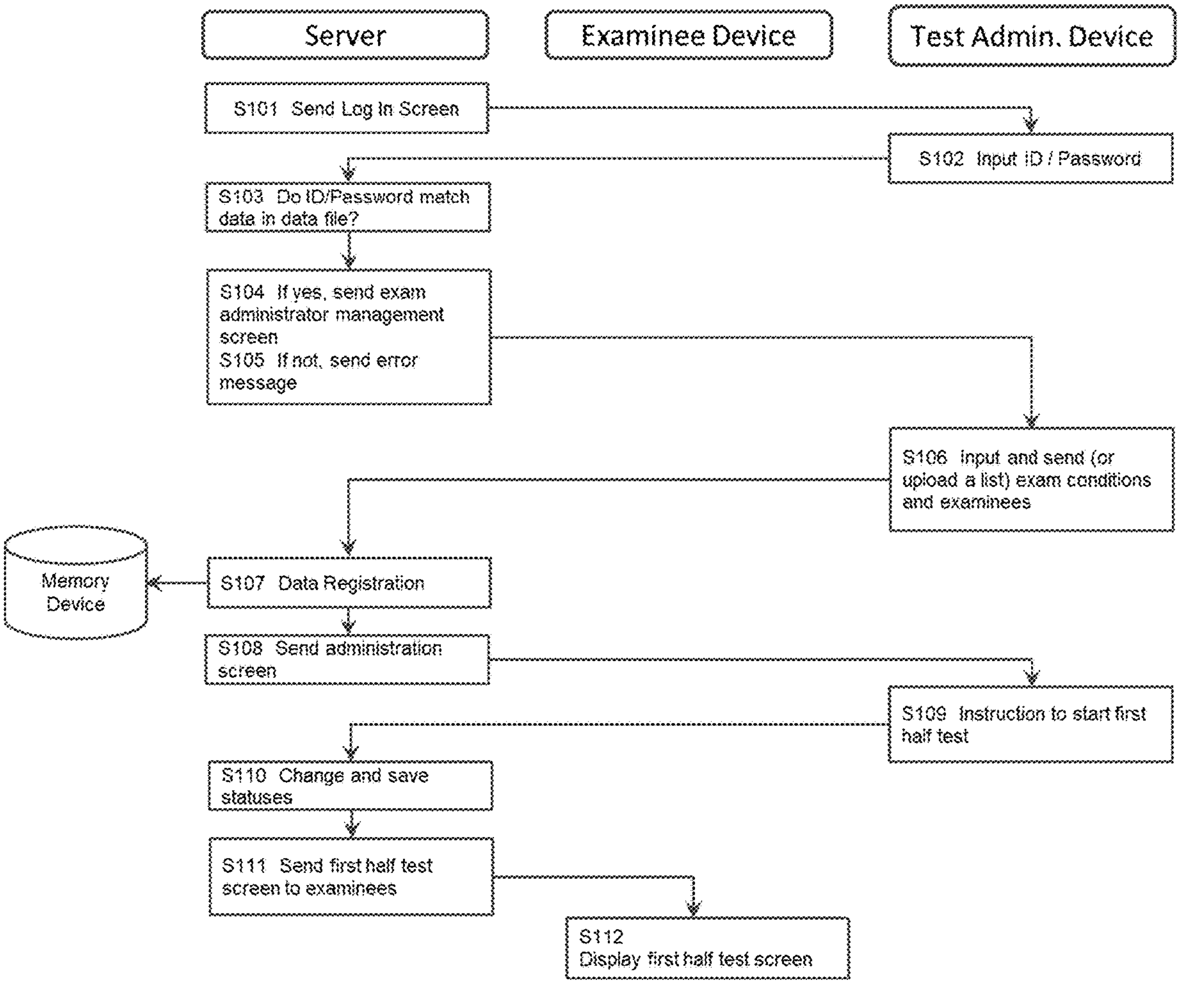

[Fig. 26]
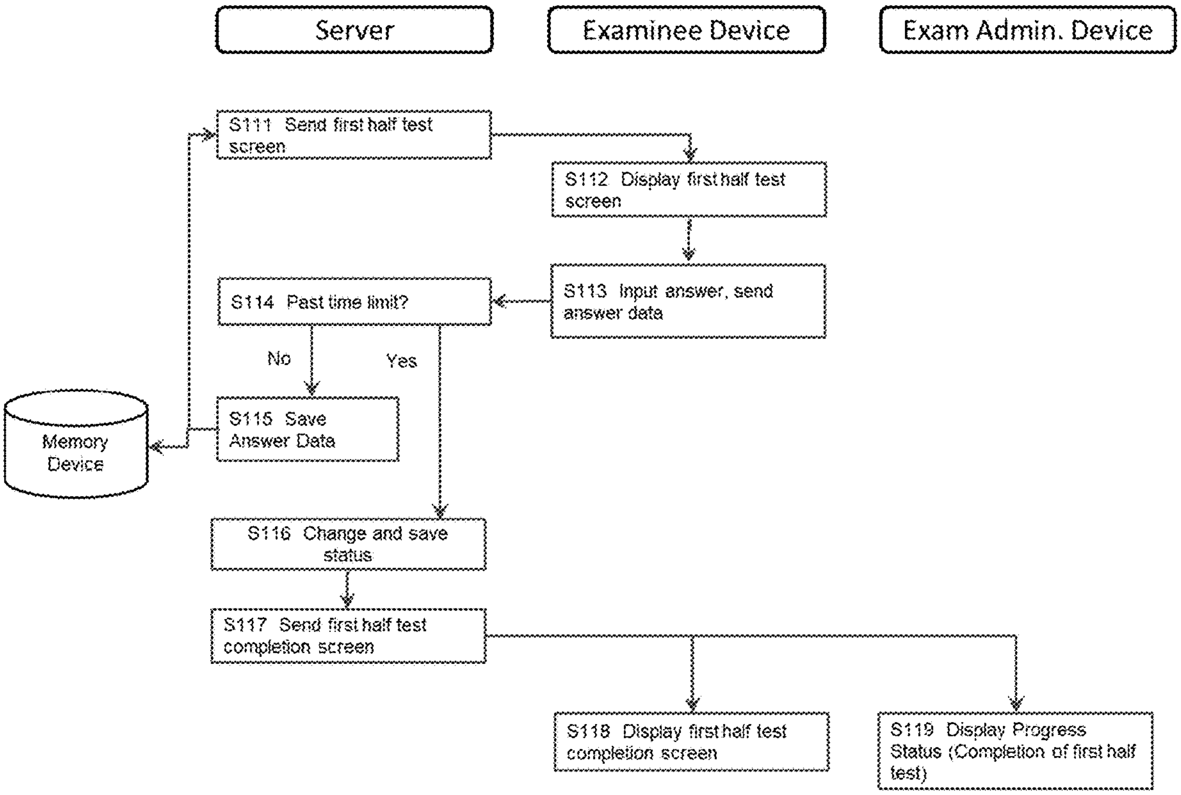

[Fig. 27]
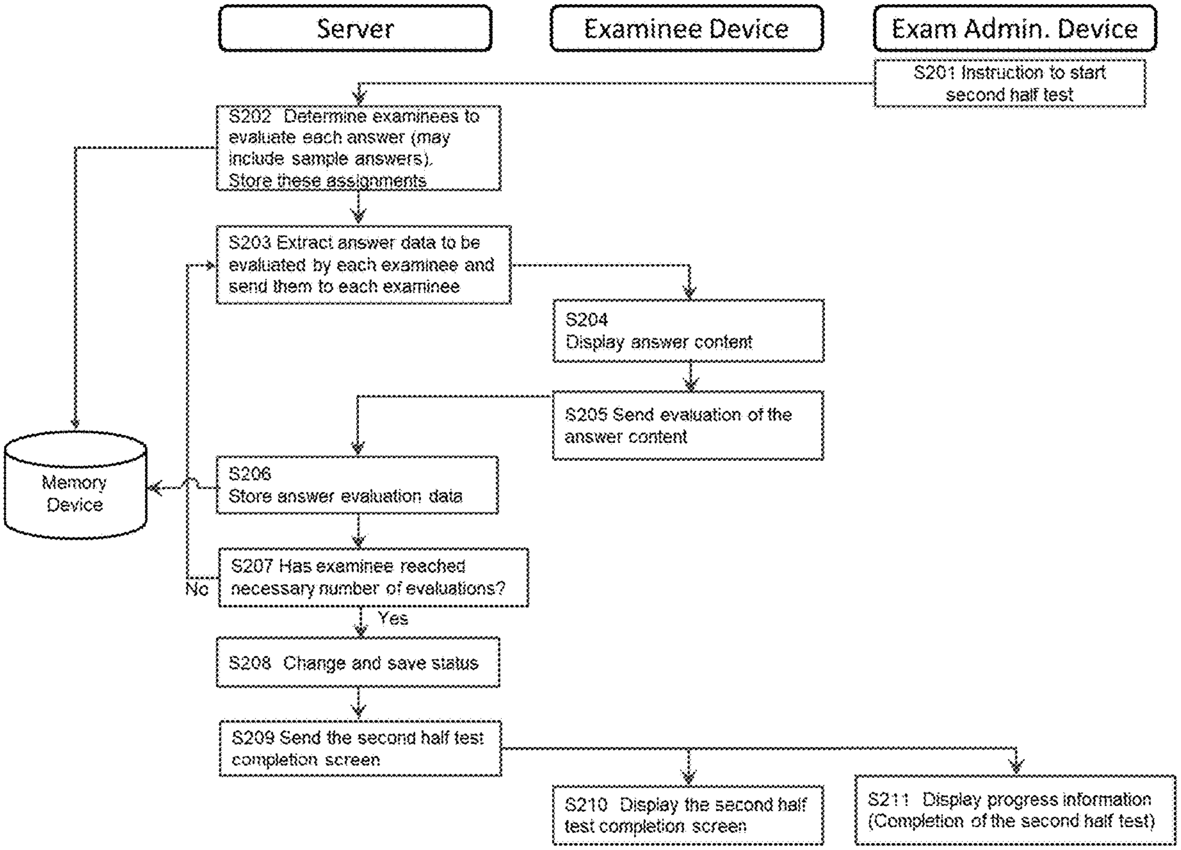

[Fig. 28]
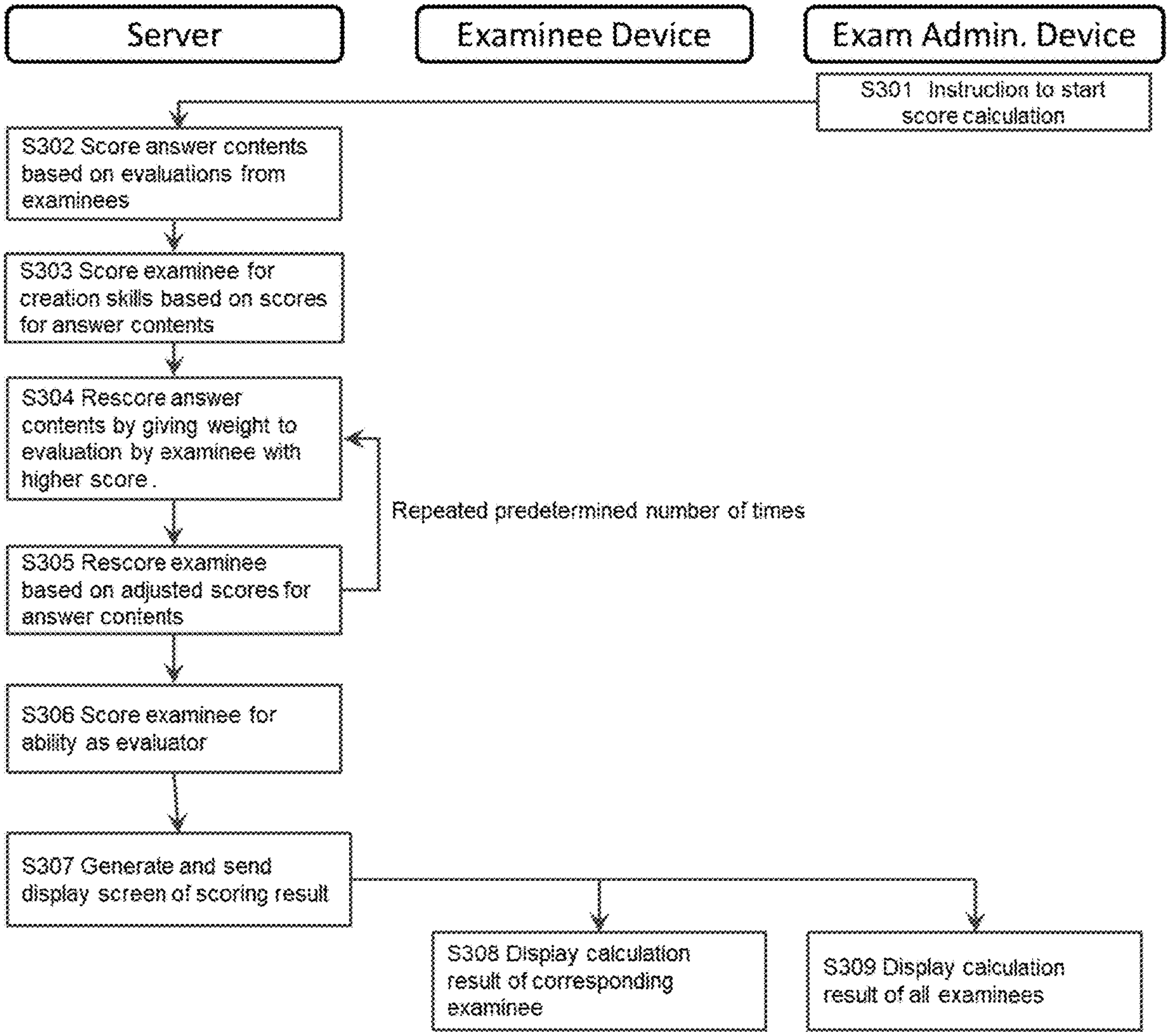

METHOD OF ONLINE TEST AND ONLINE TEST SERVER FOR EVALUATING IDEA CREATING SKILLS

This is a National Phase Application under 35 U.S.C. § 371 of PCT/JP2017/004603 filed Feb. 8, 2017 (published on Aug. 31, 2017 as WO 2017/145765); which claims priority to Japanese Patent Application No. 2016/031332 filed Feb. 22, 2016; all of which are incorporated by reference herein in their entirety.

TECHNICAL FIELD

The present invention relates a method of an online test for evaluating idea creation skills. The present invention also relate to an online test server for evaluating idea creation skills.

BACKGROUND ART

In recent years, the expansion of internet access has caused various types of tests, including those for qualifications and job screening, to be held online. Such online tests usually involve examinees receiving the exam questions on their own device from a server and sending answers that they have input to the server.

For example, JP-A-2002-62795 discloses a test system for providing examinees with questions in the designated question format, collecting answers to the questions and providing results of scoring or analyzing. It discloses that the system comprising steps of providing the examinees with a program for questioning including the questions and a transfer file for returning answers to the questions, receiving the transfer file returned by the examinees, scoring and analyzing the answers included in the transfer file, and sending to the examinees results of scoring and analyzing of the answers.

However, up till now, in most tests including online tests for measuring human's knowledges and abilities, model answers have been prepared regardless of whether the test itself involves multiple-choice or descriptive answers. Traditionally, the procedure of comparing the answers of the examinees with the model answers has been used in order to evaluate examinees. However, it is difficult for such a traditional scoring procedure to evaluate examinees for questions without model answers.

JP-T-2014-500532 therefore, proposes a system wherein examinees evaluate each other's answers for questions without a model answer. It discloses that a system comprising: a memory device resident in a computer and a processor disposed in communication with the memory device, the processor configured to request that a candidate author a question based on a subject; receive the question from the candidate; request an evaluation of the question and the subject from at least one assessor; receive a question score from each assessor, wherein the question score is an objective measure of the evaluation of the question and the subject; receive a grade for each assessor; and calculate a grade for the candidate based on the question score from each assessor, and the grade for each assessor.

CITATION LIST

Patent Literature

Patent literature 1: JP-A-2002-62795
Patent literature 2: JP-T-2014-500532

SUMMARY OF INVENTION

Problem to be Solved

Many companies, regardless of type of business, are faced with unprecedented competition environment due to the globalization of business. Their survival therefore often rests on the rapid development of goods and services which can appeal to customers. In such an environment, what companies need for development is not necessarily talent who are able to produce answers which mirror a model answer, but talent with the ability to create novel and original ideas, or in other words highly innovative talent. However, no appropriate method for evaluating such an innovative talent conventionally exists. It is difficult to evaluate an examinee's creation skills through comparing his or her answers with a set of predefined model answers. Furthermore, even if a method which allows for examinees to evaluate each other's creativity is used, it is not likely to make an appropriate assessment under the situation that assessment skills of the examinees is uncertain.

The present invention has been made under the above mentioned circumstances. An object of the present invention is thus to provide a method of an online test and an online test server for simply evaluating idea creation skills.

Solution to Problem

The inventors have studied the above problem extensively and have thought that evaluation of an innovation ability, such as an ability to create a lot of valuable ideas, an ability to create a variety of valuable ideas, or an ability to create rare valuable ideas can be easily made by conducting an online test in which a number of examinees select a situation setting related to 5W1H from a plurality of options and describe ideas (typically, business ideas) corresponding to the situation setting as much as possible within a time limit, and mathematically analyzing answers of the examinees.

In addition, the inventors have thought that the innovation ability of the examinees can be objectively evaluated and the ability of the examinees as evaluator can be also evaluated, by repeatedly conducting idea evaluation and narrowing down evaluators after having the examinees evaluate each other's ideas, assuming that the examinees that have created highly evaluated ideas have a higher ability as evaluator. The inventors have completed the present invention based on the basic ideas as described above.

Therefore, in one aspect, the present invention provides a method of an online test for evaluating idea creation skills, including:

- receiving, by a server, an instruction to start the test from an exam administrator device through a network;
- in response to the instruction to start the test, extracting, by the server, a question data from a question data memory part, and sending, by the server, the question data to each examinee device through the network, wherein the question data includes a question content for each examinee to choose a situation setting by combining at least two elements from six elements of 5W1H provided that there is a plurality of options for each element, and to describe an idea corresponding to the situation setting;
- receiving, by the server, an answer data including an answer content to the question content from said each examinee device;
- assigning, by the server, an identifier to each of the answer data including the answer content received within a time limit predetermined by a timer, and storing, by the server, the answer data in an answer data memory part in association with an identifier of an examinee who has sent the answer data;

obtaining, by the server, a random number generated by a random number generator, and using, by the server, the random number to determine an examinee who should evaluate the answer content in each of the answer data stored in the answer data memory part;

extracting, by the server, the answer data to be evaluated by the examinee from the answer data memory part, in accordance with a result of determining the examinee who should evaluate the answer content, and sending, by the server, the answer data to each examinee device through the network;

receiving, by the server, each answer evaluation data including an evaluation by the examinee of the answer content in the answer data from each examinee device;

assigning, by the server, an identifier to each of the received answer evaluation data, and storing the answer evaluation data in an answer evaluation data memory part in association with an identifier of the examinee as evaluator who has sent the answer evaluation data, an identifier of the answer data that has been evaluated, and an identifier of the examinee who has sent the answer data that has been evaluated;

aggregating, by the server, the evaluation of the answer content in each answer data based on each answer evaluation data and the identifier of the answer data stored in the answer evaluation data memory part, and calculating, by the server, a score for each answer content, and storing, by the server, the score in the answer data memory part in association with the identifier of the examinee who has sent the answer data including each answer content;

calculating, by the server, a total score per identifier of the examinee who has sent the answer data, at least partly based on the score for each answer content stored in the answer data memory part in association with the identifier of the answer data and the identifier of the examinee who has sent the answer data, and storing, by the server, the total score in an examinee evaluation data memory part in association with the identifier of the examinee who has sent the answer data, provided that when calculating the total score, the score given to each answer content is weighted according to at least one of the following weighting criteria of (1) to (3):

(1) a plurality of the answer data for the same identifier of the examinee is classified into each combination of the options and if there is a plurality of identifiers of the answer data containing the same combination of the options, the score given to each answer content is weighted such that the answer content with a lower score obtains a lower weighting;

(2) for a plurality of the answer data for the same identifier of the examinee, each of the combination of the options is quantified on a coordinate for calculation of its center point, and the score given to each answer content is weighted such that the answer content including the combination of the options with a longer distance from the center point obtains a higher weighting; and (3) a total acquired score for each of all the combinations of the options assumed from the question content is calculated by summing up scores that are associated with the identifier of the answer data including each combination of the options as the answer content, and the score given to each answer content is weighted such that the answer content including the combination of the options with a lower total acquired score obtains a higher weighting; and extracting, by the server, an examinee evaluation data including the total score for each examinee stored in the examinee evaluation data memory part, and sending the examinee evaluation data to a corresponding examinee device through the network.

In one embodiment of the method of the online test according to the present invention, after calculating, by the server, the total score for each examinee and storing, by the server, the total score in association with the identifier of the examinee in the examinee evaluation data memory part, the method further includes the following steps:

step X: ranking, by the server, each examinee based on the identifier of the examinee and the total score associated with the identifier of the examinee, aggregating again, by the server, the evaluation of the answer content per identifier of the answer data for calculating an adjusted score, provided that the evaluation associated with the identifier of the examinee with a higher rank is more highly weighted, and storing, by the server, the adjusted score in the answer data memory part in association with the identifier of the answer data; and step Y: calculating, by the server, an adjusted total score for each examinee based on the adjusted score given to each answer content and the identifier of the examinee stored in the answer data memory part, according to at least one of the evaluation procedure of said (1) to (3).

In another embodiment of the method of the online test according to the present invention, the server repeats step X and step Y at least once, assuming the adjusted total score for each examinee as the total score for each examinee.

In a further embodiment of the method of the online test according to the present invention, the method further includes:

comparing, by the server, the evaluation of each answer content associated with the identifier of the examinee as evaluator stored in the answer evaluation data memory part, with the non-adjusted or adjusted score given to the answer content stored in the answer data memory part, aggregating, by the server, an approximation between them per examinee for calculating, by the server, an evaluation accuracy of each examinee, and storing, by the server, the evaluation accuracy in the examinee evaluation data memory part in association with the identifier of each examinee; and extracting, by the server, the examinee evaluation data including the evaluation accuracy of each examinee stored in the examinee evaluation data memory part, based on the identifier of the examinee, and sending, by the server, the examinee evaluation data of each examinee to a corresponding examinee device through the network.

In a further embodiment of the method of the online test according to the present invention, each answer data including an answer content by two or more sample examinees is stored in association with an identifier of the answer data in the answer data memory part, and the method further includes:

calculating, by the server, an average value A1 of the total scores for all the examinees including the sample examinees or not including the sample examinees, based on the total score or the adjusted total score, if adjusted, for each examinee;

calculating, by the server, an average value A2 of the total scores for the sample examinees, based on the total scores or the adjusted total scores, if adjusted, for the sample examinees;

calculating, by the server, a difference between A1 and A2;

subtracting, by the server, the difference between A1 and A2 from each of the total scores for the examinees such that the average value of the total scores for all the examinees is modified from A1 to A2 for obtaining a standardized total score for each examinee, and storing, by the server, the standardized total score for each examinee in the examinee evaluation data memory part in association with the identifier of the examinee; and extracting, by the server, the examinee evaluation data including the total score for each examinee after standardization stored in the examinee evaluation data memory part based on the identifier of the examinee, and sending the examinee evaluation data to a corresponding examinee device through the network.

In a further embodiment of the method of the online test according to the present invention, each answer data including an answer content by two or more sample examinees is stored in association with each identifier of the answer data in the answer data memory part, and the method further includes:

calculating, by the server, an average value A1 of the total scores for all the examinees including the sample examinees or not including the sample examinees, based on the total score or the adjusted total score, if adjusted, for each examinee;

calculating, by the server, a standard deviation D1 of the total scores for all the examinees including the sample examinees or not including the sample examinees, based on the total score or the adjusted total score, if adjusted, for each examinee;

calculating, by the server, a standard deviation D2 of the total scores for the sample examinees, based on the total scores or the adjusted total scores, if adjusted, for the sample examinees;

calculating, by the server, a ratio of D1 and D2;

multiplying, by the server, a difference between the total score for each examinee and the average value A1 by the ratio of D1 and D2 such that the standard deviation for all the examinees is modified from D1 to D2 for obtaining each multiplication value;

adding, by the server, the multiplication value to the average value A1 for obtaining a standardized total score for each examinee, and storing the standardized total score for each examinee in the examinee evaluation data memory part in association with the identifier of the examinee; and extracting, by the server, the examinee evaluation data including the standardized total score for each examinee stored in the examinee evaluation data memory part based on the identifier of the examinee, and sending the examinee evaluation data to a corresponding examinee device through the network.

In another aspect, the present invention provides an online test server for evaluating idea creation skills, including a transmitting and receiving unit, a control unit, a memory device, a timer, and a random number generator;

the memory device including:

an examinee account data memory part, operable to store each examinee account information in association with an identifier of the examinee:

a question data memory part, operable to store a question data including a question content to choose a situation setting by combining at least two elements from six elements of 5W1H provided that there is a plurality of options for each element, and to describe an idea corresponding to the situation setting;

an answer data memory part, operable to store an answer data including an answer content of the examinee to the question content received at the transmitting and receiving unit, in association with an identifier of the answer data and the identifier of the examinee who has sent the answer data;

an answer evaluation data memory part, operable to store an answer evaluation data including an evaluation by the examinee of the answer content in the answer data received at the transmitting and receiving unit, in association with an identifier of the answer evaluation data together with the identifier of the examinee as evaluator who has sent the answer evaluation data, the identifier of the answer data that has been evaluated, and the identifier of the examinee who has sent the answer data that has been evaluated; and an examinee evaluation data memory part, operable to store a total score for the examinee in association with the identifier of the examinee;

the control unit including a data registration part, a question extraction part, a time limit judgement part, an evaluator determination part, an answer extraction part, an answer evaluation part, an examinee evaluation part, and an examinee evaluation extraction part, wherein:

the data registration part is operable to assign an identifier to the answer data received at the transmitting and receiving unit, if judged by the time limit judgement part that the answer data has been received within a time limit, and to store the answer data in the answer data memory part in association with the identifier of the examinee who has sent the answer data, and operable to assign an identifier to the answer evaluation data received at the transmitting and receiving unit and to store the answer evaluation data in the answer evaluation data memory part in association with the identifier of the examinee who has sent the answer evaluation data and the identifier of the answer data that has been evaluated;

the question extraction part is operable to extract the question data from the question data memory part once the transmitting and receiving unit receives an instruction from an exam administrator device and to send the question data simultaneously to each examinee device through a network, and operable to extract the question data from the question data memory part in accordance with an instruction of the time limit judgement part and to send the question data individually to a corresponding examinee device from the transmitting and receiving unit through the network;

the time limit judgment part is operable to use the timer to judge whether a receiving time of the answer data at the transmitting and receiving unit that has been sent from the examinee device is within or not within the time limit, and based on a result of the judgement, when judging the receiving time is within the time limit, the time limit judgment part is operable to assign an identifier to the answer data and to instruct to the data registration part to store the answer data in the answer data memory part in association with the identifier of the examinee who has sent the answer data, and the time limit judgment part is operable to instruct the question extraction part to re-send the question data in a displayable form from the transmitting and receiving unit to the examinee device from which the answer data has been sent;

the evaluator determination part is operable to obtain a random number generated by the random number generator when the transmitting and receiving unit receives an instruction from the exam administrator device, and to use the random number to determine an examinee(s) who should evaluate the answer content in each answer data stored in the answer data memory part by associating the identifier of the examinee as evaluator with the identifier of the answer data;

the answer extraction part is operable to extract the answer data to be evaluated by the examinee based on the identifier of the answer data and the identifier of the examinee as evaluator associated with the identifier of the answer data in accordance with a result of determining the examinee who should evaluate the answer content by the evaluator determination part, and to send the answer data to a corresponding examinee device through the network;

the answer evaluation part is operable to aggregate the evaluation of the answer content per identifier of the answer data based on the evaluation by the examinee of the answer content and the identifier of the answer data including the answer content stored in the answer evaluation data memory part for calculating a score for the answer content, and operable to store the score in the answer data memory part in association with the identifier of the answer data; and the examinee evaluation part is operable to calculate a total score per identifier of the examinee who has sent the answer data, at least partly based on the score for each answer content stored in the answer data memory part in association with the identifier of the answer data and the identifier of the examinee who has sent the answer data, and to store the total score in the examinee evaluation data memory part in association with the identifier of the examinee who has sent the answer data, provided that when calculating the total score, the score given to each answer content is weighted according to at least one of the following weighting criteria of (1) to (3):

(1) a plurality of the answer data for the same identifier of the examinee is classified into each combination of the options and if there is a plurality of identifiers of the answer data containing the same combination of the options, the score given to each answer content is weighted such that the answer content with a lower score obtains a lower weighting;

(2) for a plurality of the answer data for the same identifier of the examinee, each of the combination of the options is quantified on a coordinate for calculation of its center point, and the score given to each answer content is weighted such that the answer content including the combination of the options with a longer distance from the center point obtains a higher weighting; and (3) a total acquired score for each of all the combinations of the options assumed from the question content is calculated by summing up scores that are associated with the identifier of the answer data including each combination of the options as the answer content, and the score given to each answer content is weighted such that the answer content including the combination of the options with a lower total acquired score obtains a higher weighting; and the examinee evaluation extraction part is operable to extract the examinee evaluation data including the total score for each examinee stored in the examinee evaluation data memory part, and operable to send the examinee evaluation data to a corresponding examinee device through the network.

In one embodiment of the online test server according to the present invention, the answer evaluation part is further operable to rank each examinee based on the identifier of the examinee and the total score associated with the identifier of the examinee, to aggregate again the evaluation of the answer content per identifier of the answer data for calculating an adjusted score, provided that the evaluation associated with the identifier of the examinee with a higher rank is more highly weighted, and to store the adjusted score in the answer data memory part in association with the identifier of the answer data, and the examinee evaluation part is further operable to calculate an adjusted total score per identifier of the examinee at least partly based on the adjusted score for the answer content stored in the answer data memory part in association with the identifier of the answer data and the identifier of the examinee.

In another embodiment of the online test server according to the present invention, the server further includes an evaluation accuracy calculation part, wherein the evaluation accuracy calculation part is operable to compare the evaluation of each answer content associated with the identifier of the examinee as evaluator stored in the answer evaluation data memory part, with the non-adjusted or adjusted score given to the answer content stored in the answer data memory part, to aggregate an approximation between them per examinee for calculating an evaluation accuracy of each examinee, and to store the evaluation accuracy in the examinee evaluation data memory part in association with the identifier of each examinee; and the examinee evaluation extraction part is further operable to extract the examinee evaluation data including the evaluation accuracy of each examinee stored in the examinee evaluation data memory part, based on the identifier of the examinee, and to send the examinee evaluation data of each examinee to a corresponding examinee device through the network.

In a further embodiment of the online test server according to the present invention, each answer data including an answer content of two or more sample examinees is stored in association with the identifier of the answer data in the answer data memory part, the online test server further includes a score standardization part that is operable:

to calculate an average value A1 of the total scores for all the examinees including the sample examinees or not including the sample examinees, based on the total score or the adjusted total score, if adjusted, for each examinee;

to calculate an average value A2 of the total scores for the sample examinees, based on the total scores or the adjusted total scores, if adjusted, for the sample examinees calculated by the examinee evaluation part;

to calculate a difference between A1 and A2;

to subtract the difference between A1 and A2 from each of the total scores for the examinees such that the average value of the total scores for all the examinees is modified from A1 to A2 for obtaining a standardized total score for each examinee, and to store the standardized total score for each examinee in the examinee evaluation data memory part in association with the identifier of the examinee; and the examinee evaluation extraction part is operable to extract the examinee evaluation data including the total score for each examinee after standardization stored in the examinee evaluation data memory part based on the identifier of the examinee, and to send the examinee evaluation data to a corresponding examinee device through the network.

In a further embodiment of the online test server according to the present invention, each answer data including an answer content of two or more sample examinees is stored in association with the identifier of the answer data in the answer data memory part, the online test server further comprises a score standardization part that is operable:

to calculate an average value A1 of the total scores for all the examinees including the sample examinees or not including the sample examinees, based on the total score or the adjusted total score, if adjusted, for each examinee; and the score standardization part is further operable: to calculate a standard deviation D1 of the total scores for all the examinees including the sample examinees or not including the sample examinees, based on the total score or the adjusted total score, if adjusted, for each examinee;

to calculate a standard deviation D2 of the total scores for the sample examinees, based on the total scores or the adjusted total scores, if adjusted, for the sample examinees calculated by the examinee evaluation part;

to calculate a ratio of D1 and D2;

to multiply a difference between the total score for each examinee and the average value A1 by the ratio of D1 and D2 such that the standard deviation for all the examinees is modified from D1 to D2 for obtaining each multiplication value, to add the multiplication value to the average value A1 for obtaining a standardized total score for each examinee, and to store the standardized total score for each examinee in the examinee evaluation data memory part in association with the identifier of the examinee; and the examinee evaluation extraction part is operable to extract the examinee evaluation data including the standardized total score for each examinee stored in the examinee evaluation data memory part based on the identifier of the examinee, and to send the examinee evaluation data to a corresponding examinee device through the network.

In a further aspect, the present invention provides a program for executing the method of the online test according to the present invention by a computer.

In a further aspect, the present invention provides a computer readable-storage medium storing the program according to the present invention.

Effects of Invention

In one embodiment of the present invention, there can be provided a simple tool for evaluating idea creation skills of examinees. Companies are able to utilize the test results in order to ensure proper placement and training of personnel. In particular, by placing highly innovative people in departments involved in developing new business, the companies can expect accelerated development of new innovative products and services. In addition, through allowing the examinees to understand their own characteristics and room for growth regarding their innovativeness, the examinees can gain the benefit that they can choose their careers best suited for them.

When the examinees evaluate each other's answer according to another embodiment of the present invention, a more objective evaluation can be made because idea creation skills of each examinee can be measured based on a number of evaluations. In addition, the present invention can measure not only idea creation skills, but also the ability as evaluator of evaluating idea creation skills of others.

BRIEF DESCRIPTION OF DRAWING

FIG. 1 shows a conceptual diagram of a procedure according to an embodiment of an online test according to the present invention.

FIG. 2 shows a conceptual diagram of evaluation results obtained by an embodiment of an online test according to the present invention.

FIG. 3 shows a conceptual diagram showing a repetition of ranking of ideas and mutual evaluation performed in one embodiment of online test according to the present invention.

FIG. 4 shows an example of the overall configuration of an online test system according to the present invention.

FIG. 5 shows an example of a basic hardware configuration of a server, a examinee device, an exam administrator device, and a server administrator device.

FIG. 6 shows an example of a functional block diagram of the server.

FIG. 7 shows an example of a table structure of a question data file.

FIG. 8 shows an example of a table structure of one answer datum in an answer data file.

FIG. 9 shows an example of a table structure in an answer evaluation data file where one answer evaluation datum is stored.

FIG. 10 shows an example of a table structure in an examinee evaluation data file where one examinee evaluation datum is stored.

FIG. 11 shows an example of a table structure in an examinee account data file where an account information of one examinee is stored.

FIG. 12 shows an example of a table structure in an exam administrator account data file where an exam administrator account information is stored.

FIG. 13 shows an example of a table structure in a server administrator account data file where a server administrator account information is stored.

FIG. 14 shows an example of a table structure in a test condition data file where a test condition information is stored.

FIG. 15 shows an example of a table structure in a second half test progress management data file where a progress status of a second half test is stored.

FIG. 16 is an example of a top screen displayed on the examinee device.

FIG. 17 is an example of a menu screen of an examinee page displayed on the examinee device.

FIG. 18 is an example of a first half test screen of the examinee page displayed on the examinee device.

FIG. 19 is an example of a second half test screen of the examinee page displayed on the examinee device.

FIG. 20 is an example of a scoring result screen of the examinee page displayed on the examinee device.

FIG. 21 is an example of a management screen of an exam administrator page displayed on an exam administrator device.

FIG. 22 is an example of a test condition setting screen of an exam administrator page displayed on the exam administrator device.

FIG. 23 is an example of an exam administrator account information input screen of a server administrator page displayed on a server administrator device.

FIG. 24 is an example of a question content input screen of the server administrator page displayed on the server administrator device.

FIG. 25 is a flowchart showing a process flow from the point where the exam administrator accesses the server to register examinees and enter test condition to the point where the test screen of the idea creation skills test (the first half test) is displayed on each examinee device.

FIG. 26 is a flowchart showing a process flow from the start of the idea creation skills test (first half test) to the end of the first half test.

FIG. 27 is a flowchart showing a process flow from the start of the idea evaluation test (the second half test) to the end of the second half test.

FIG. 28 is a flowchart showing a process flow of scoring the examinees and sending the results to the examinees and the exam administrator by the server after the end of the idea evaluation test (the second half test).

DESCRIPTION OF EMBODIMENTS

Hereinafter, the embodiments of the method of the online test for evaluating idea creation skills according to the present invention will be described in detail with reference to the drawings, but the present invention is not limited to these embodiments.

FIG. 1 and FIG. 2 shows conceptual diagrams of an online test according to the first embodiment of the present invention. In a first half test, examinees are prompted to select one option among a plurality of options regarding 5W1H elements, such as "who", "where" and "what", and describe an idea related to the selected option. The examinees may repeatedly select options and describe ideas within the test time. Each idea generated by the examinees will be evaluated by a plurality of examinees other than oneself using a scale which can be Good/Bad, etc. in a second half test. Based on the results of the mutual evaluation, indexes for the idea creation skills of the examinees are calculated. Since question contents are multiple-choice formula, it is possible to easily plot the obtained calculation result on the multi-dimensional space by converting the combinations of options into numerical values. As a result, as shown in FIG. 2, for example, distribution and tendency of ideas generated by each examinee can be visually understood from the viewpoint of the entire examinees (including the quantity of ideas, variety of contents and rareness of ideas). Therefore, by aggregating the results for each examinee, the exam administrator can visually understand not only idea creation skills of personnel held by the company, but also the distribution of human resources related to idea creation skills.

1. System Structure

FIG. 4 shows the overall configuration of the online test system according to this embodiment. The system includes a server (11), a plurality of examinee devices (12) ranging from number 1 to number n, an exam administrator device (13) and a server administrator device (15). The examinee devices (12), the exam administrator device (13), and the server administrator device (15) are connected for intercommunication with the server (11) through a computer network (14), such as the Internet, a private connection or a public connection. The server administrator device (15) may not necessarily be separate from the server (11) as an independent terminal, and the server (11) may perform the function of the server administrator device (15).

[Network]

The computer network (14) is not limited, but may be a wired network such as LAN (Local Area Network) and WAN (Wide Area Network) and may be a wireless network such as WLAN (Wireless Local Area Network) using MIMO (Multiple-Input Multiple-Output). In addition, the computer network (14) may be the Internet with a communication protocol such as TCP/IP (Transmission Control Protocol/Internet Protocols), or may be through a base station (not shown) that plays a role as a so-called wireless LAN access point (Wireless LAN Access Point).

The "server" refers to a server computer and may be configured by one or more computers operating together. The examinee devices (12) and the exam administrator device (13) can be performed not only by a personal computer equipped with browsers but also by portable devices such as a smartphone, a tablet, a cellphone, a mobile, a PDA (personal digital assistant), and furthermore they can be configured by devices/equipment allowing communication through the computer network such as a digital TV.

The basic hardware structure of the server (11), the examinee devices (12), the exam administrator device (13) and the server administrator device (15) are the same, and as shown in FIG. 5, they can be realized by a computer (200) including a processing device (201), a memory device (202), an output device (203), an input device (204) and a communicating device (205). In addition, a random number generator (206) and timer (207) may be included as necessary.

The processing device (201) refers to a device, a circuit and the like that controls the entire computer and performs processing operations according to a program based on commands, instructions and data input by the input device (204) as well as data stored in the memory device (202), and the like. As the processing device (201), CPUs (Central Processing Units), MPUs (Micro Processing Units) and the like may be adopted. The memory device (202) refers to a device, a circuit and the like storing various forms of data, the operating system (OS), the network application (e.g. a web server software for the server (11), browsers for the examinee devices (12), the exam administrator device (13) and the server administrator device (15)) and programs for performing various calculation. For example, known memory devices such as a primary storage device largely employing a semiconductor memory, a secondary (auxiliary) storage device largely employing a hard disk and a semiconductor disk, an offline storage device largely employing a removable media drive like CD-ROM, and a tape library may be used.

More specifically, in addition to magnetic memory storage devices such as hard-disk drives, floppy™ disks drives, zip drives and tape storages, memory devices/circuits employing semiconductor memory such as registers, cache memory, ROM, RAM, flash memory (such as USB memory devices), semiconductor disks (such as RAM disks and virtual disk drives), optical storage media such as CDs and DVDs, optical storage devices employing magneto-optical disks like MO, other memory devices such as paper tapes and punch cards, memory devices employing phase change memory technique called PRAM (Phase change RAM), holographic memory, memory devices employing 3-dimensional optical memory, memory devices employing molecular memory which stores information through accumulating electrical charge at the molecular level, etc. may all be used.

The output device (203) refers to an interface such as a device or circuit that enables output of data and/or commands. As the output device (203), a display such as LCD and OEL as well as a printer and a speaker, etc. can be employed.

The input device (204) refers to an interface to pass data or commands to the processing device (201). As the input device (204), a keyboard, a numeric keypad, a pointing device such as a mouse, a touch panel, a reader (OCR), an input screen and an audio input interfaces such as a microphone may be employed.

The communicating device (205) refers to a device and a circuit for sending and receiving data to/from the outside the computer. The communicating device (205) may be an interface such as a LAN port, a modem, wireless LAN and a router. The communicating device (205) can send/receive the processed results by the processing device (201) and information stored in the memory device (202) through the computer network (14).

The random number generator (206) is a device which is able to provide random numbers.

The timer (207) is a device which is able to track and inform time.

[Server]

FIG. 6 shows an example of a functional block diagram of the server (11). The server (11) includes a transmitting and receiving unit (310), a control unit (320) and a memory device (340).

The memory device (340) in the server (11) may store a question data file (341), answer data file (342), answer evaluation data file (343), examinee evaluation data file (344), examinee account data file (345), exam administrator account data file (346), server administrator account data file (347), test condition data file (348) and second half test progress management data file (349). These files may be separated into individual files based on the types of data contained, and may also be combined into a single file.

The question data file (341) may store question contents for causing ideas to be answered. FIG. 7 shows an example of a table structure of the question data file (341). In order for easy evaluation and analysis of the idea creation skills, it is preferred that the question at least partially includes a multiple-choice question. In one embodiment, the question may cause the examinees to choose a situation setting by combining at least two elements from six elements of 5W1H provided that there is a plurality of options for each element. In one specific embodiment of the present invention, the question is given for each element of "Who", "Where", "When", "When", "What" in a multiple-choice form, respectively, and the examinees may select the combination of these elements and answer. For example, the "who" element may have the following options: children, adults, females, males and the elderly. The examinees are preferably required to describe their ideas (such as business ideas) with regard to the selected combination(s) in an open-ended answer section. This can facilitate concrete recognition of the ideas of the examinees and evaluation of such ideas by evaluators. One or more of open-ended answer section may be provided, and it is possible to describe "needs (for example, business needs)" and "ideas (for example, solutions to needs)" arising from the combination of the above elements. FIG. 18 shows an example of a test screen displayed on the examinee devices.

The answer data file (342) may store answer contents of the examinees to the question content in a searchable form. FIG. 8 shows an example of a table structure of one answer datum in the answer data file. This table may store an idea answer ID which represents an identifier of the answer data, an examinee ID (examinee number) which represents an identifier of the examinee who has sent the answer data, an answer to the question in the multiple-choice form, an answer to the question in the open-ended form, a score calculation result for the answer data, and a current status of the examinees (test not yet started, test in progress, test ended etc.). The score calculation result is a score (scoring result) for the answer data, and the score for each answer content may be stored, which is calculated by aggregating the evaluation of the answer content in the answer data based on each answer evaluation data and the identifier of answer data stored in the answer evaluation data file (343). As will be described below, the calculated score may be adjusted once or more times, therefore, each of the calculated scores obtained after each adjustment may be stored in the answer evaluation data file (343) as "Calculated Score 1", "Calculated Score 2" etc.

For a standardization of the scores as described below, the answer data file (342) may store the answer data including the answer content by two or more sample examinees beforehand in association with the idea answer ID as samples. From the perspective of improving the standardization effect, the answer data by the sample examinees may be preferably made by 5 or more people, and more preferably by 8 or more people. However, since an excessive number of the sample examinees would increase a burden on the examinees who evaluate the answer, it is common to set the number to 15 or less, and it is preferable to set it to 12 or less.

The answer evaluation data file (343) may store the answer evaluation data, which includes the evaluations for each of the answer contents by the evaluators (e.g. the examinees), in a searchable form. FIG. 9 shows an example of a table structure of one answer evaluation data in the answer evaluation data file (343). This table may store the answer evaluation ID which represents the identifier of the answer evaluation data, the idea answer ID which represents the identifier of the evaluated answer data, the evaluator's examinee ID, the examinee ID which represents the identifier of the examinee who has sent the evaluated answer data, the answer evaluation showing the result given by the evaluator to the answer content and the status which represents the progress (e.g. not yet evaluated, evaluation complete etc.). The answer evaluation may take the multiple-choice form such as between "○" and "x" (alternative format) or between "Good" and "Bad", or may be a score within a predetermined range.

The examinee evaluation data file (344) may store the evaluation result of each examinee in a searchable form. FIG. 10 shows an example of a table structure of one examinee evaluation datum in the examinee evaluation data file (344). This table may store the examinee ID which represents the identifier of the examinee and the score calculation result, which is a total score for each examinee ID. As will be described below, the score calculation result may be adjusted once or more times, therefore, the score calculation result obtained after each adjustment may be stored in the examinee evaluation data file (344) as "Calculated Score 1", "Calculated Score 2", etc. for example. In addition, this table may also store the registration date and time when the examinee or the exam administrator creates and registers the account, the date and time when the first half test (for the idea creation skill) becomes open (in the case of simultaneous test in a classroom or the like, it means the date and time when the first half test is started. On the other hand, in case where the examinee is entrusted with the timing of start since the test is conducted at a remote location, etc., it means the date and time when the examinee can take the first half test.), the date and time when the first half test closes (In the case of simultaneous test in a classroom or the like, it means the date and time when the first half test date is finished. On the other hand, in case where the examinee is entrusted with the timing of start since the test is conducted at a remote location, etc., it means the date and time when the examinee should complete the first half test.), the date and time when the second half test (test for mutual evaluation of the ideas) becomes open (in the case of simultaneous test in a classroom or the like, it means the dates and time of the second half test date is started. On the other hand, in case where the examinee is entrusted with the timing of start since the test is conducted at a remote location, etc., it means the date and time when the examinee can take the second half test.), and the date and time when the second half test closes (in the case of simultaneous test in a classroom or the like, it means the date and time when the first half test date is finished. On the other hand, in case where the examinee is entrusted with the timing of start since the test is conducted at a remote location, etc., it means the date and time when the examinee should complete the second half test.), and a status which represents the progress (e.g. not yet evaluated, under evaluation, evaluation complete etc.). In addition to the examinee ID, an individual ID, which is an identifier of the examinee, may be stored. Both of the examinee ID and the individual ID are a kind of the identifiers of the examinees. However, storing the individual ID identifying each individual, in addition to the examinee ID, which is an examinee number, enables to easily analyze a transition of the test results, in case where the same individual takes the test multiple times.

The examinee account data file (345) may store the account information of each examinee in a searchable form. FIG. 11 shows an example of a table structure storing an account information of one examinee in the examinee account data file (345). This table may store the individual ID of each examinee, the examinee ID, an organization ID which the examinee belongs to, the internal ID (e.g. employee number) of the examinee, the examinee's name, Kana reading of the name, e-mail address, department name, date of birth, postal code, address, account creation date/time, password for login, status etc. The status may include information related to the progress (e.g. test not yet started, the first half test in progress, under the first half test, the first half test ended, under the second half test, the second half test ended etc.)

The exam administrator account data file (346) may store the account information of the exam administrator such as information about the organization (e.g. company) which the exam administrator belongs to in a searchable form. FIG. 12 shows an example of a table structure storing the exam administrator account information in the exam administrator account data file (346). In case where the exam administrator is an organization (e.g. a company), this table may store the organization's ID, the organization name, organization's Kana reading, organization's address and postal code, department-in-charge, the person-in-charge's Kana reading, telephone number, e-mail address, date/time of account creation, password for login, status etc. The status item may include information statuses related to the existence of the exam administrator account such as "Account Closed" etc.

The server administrator account data file (347) may store the account information of the server administrator in a searchable form. FIG. 13 shows an example of a table structure storing the server administrator account information in the server administrator account data file (347). This table may store the server administrator's ID, password, date/time of account creation, level of authorization etc.

The test condition data file (348) may store information related to the test conditions. FIG. 14 shows an example of a table structure storing test condition information in the test condition data file (348). This table may store the test conditions such as the test condition ID, the date and time at which the first half test becomes open, the date and time when the first half test closes, the first half test duration, whether the first half test can be paused and resumed, the date and time at which the second half test becomes open, the date and time when the second half test closes, the number of the evaluators for each idea in the second half test, permitted range of external access. The number of the evaluators for each idea refers to the number of the evaluators who evaluate each of the answer contents. As the number of the evaluators gets higher, the more evaluation can be obtained from the evaluators, making the test more objective. Therefore, the number of the evaluators may be preferably more than one, more preferably 5 or more, and furthermore preferably 10 or more. However, a practical number of the evaluators (for example, a range of 5 to 20 people) may be set based on the test time and the number of the examinees.

The second half test progress management data file (349) may store information related to the progress of the second half test for mutual evaluation among the examinees. FIG. 15 shows an example of a table structure storing a progress status of the second half test in the second half test progress management data file (349). This table may store the examinee ID, the idea answer ID to be evaluated by the examinee having the examinee ID, the number of evaluations to be made, the number of completed evaluations.

In the above tables in the data files, data types such as "int" (integers), "text" (character string type), "float" (floating decimal numbers), "crypt" (encrypted strings) and "date" (date and time type) are used for each filed. However, the data types are not limited to the illustrated form, but may be adjusted as necessary.

The server (11) may exchange various types of data with the examinee devices (12), the exam administrator device (13) and the server administrator device (15) through the transmitting and receiving unit (310) via the network (14). For example, the transmitting and receiving unit (310) may receive an instruction to start the test from an exam administrator device (13), send to each examinee device (12) the question data stored in the question data file (341) in a displayable form, receive the answer data including the answer content for the question content from each examinee device (12), send the answer data stored in the answer data file (342) to be evaluated by each examinee in a displayable form, receive the answer evaluation data including the evaluation by each examinee of the answer from each examinee device (12) and send the examinee evaluation data stored in the examinee evaluation data file (344) and including the evaluation results showing the idea creation skills and/or the assessment skills to each examinee device (12) in a displayable form examinee.

The control unit (320) in the server (11) may include an authentication processing part (321), a data registration part (322), a question extraction part (323), a time limit judgement part (324), an evaluator determination part (325), an answer extraction part (326), an answer evaluation part (327), an examinee evaluation part (328), an examinee evaluation extraction part (329), an evaluation accuracy calculation part (330), a score standardization part (331), and an evaluation number judgement part (332). Each unit is able to perform the predetermined calculations based on each of their programs.

The authentication processing part (321) may authorize the examinee ID and password based on an access request from the examinee devices (12). For example, the access request from the examinee devices (12) can be executed by inputting the examinee ID and password and clicking a login button on a screen of a top page on the examinee devices (12) as shown in FIG. 16. The examinee ID and password of each examinee may be given in advance by the server administrator. The authentication processing may be executed by the authentication processing part (321) which can refer to the examinee account data file (345) and determine whether or not the input examinee ID and password match the data stored in the examinee account data file 345. If the input examinee ID and password match the stored data, the screen data of the examinees page (e.g. a menu screen or test screen shown in FIG. 17 and FIG. 18) can be sent from the transmitting and receiving unit (310) to the corresponding examinee device (12). If not matching, an error message may be sent.

In addition, the authentication processing part (321) may authorize the Group ID and password based on an access request from the exam administrator device (13). The exam administrator ID and password may be given in advance by the server administrator. The authentication processing may be executed by the authentication processing part (321) which can refer to the exam administrator account data file (346) and determine whether or not the input exam administrator ID and password match the data stored in the exam administrator account data file (346). If the input exam administrator ID and password match the stored data, the screen data of the exam administrator page (e.g. the exam administrator screen shown in FIG. 21 and FIG. 22) can be sent from the transmitting and receiving unit (310) to the corresponding exam administrator device (13). If not matching, an error message may be sent.

In addition, the authentication processing part (321) may authorize the server administrator ID and password based on an access request from the server administrator device (15). The server administrator ID and password may be given in advance by the server administrator. The authentication processing may be executed by the authentication processing part (321) which can refer to the server administrator account data file (347) and determine whether or not the input server administrator ID and password match the data stored in the server administrator account data file (347). If the input server administrator ID and password match the stored data, the screen data of the server administrator page (e.g. the administrator screen shown in FIG. 23) can be sent from the transmitting and receiving unit (310) to the corresponding server administrator device (15). If not matching, an error message may be sent.

The data registration part (322) may register the examinees' information. For example, when an exam administrator such as a company to which the examinees belong logins using the exam administrator device (13) according to the above procedures, an exam administrator screen as shown in FIG. 21 will be displayed on the exam administrator device (13). When the exam administrator clicks either a "Bulk addition of examinees" or "Individual addition of examinees" button, a screen to input the examinee account information (although not shown) will be displayed on the exam administrator device (13), and on the screen, the predetermined examinee account information to be stored in the examinee account data file (345) such as an examinee's individual ID, examinee ID, organization ID which the examinees belong to, and employee numbers. Once input has been completed, through clicking a "CSV bulk upload" or a "CSV individual Upload", the examinee account information can be sent to the server (11). In this way, the transmitting and receiving unit (310) in the server (11) can receive the examinee account information sent to the server (11), and the data registration part (322) can store the received information in the examinee account data file (345).

The data registration part (322) may register the test conditions. For example, when the exam administrator clicks a "Set Test Conditions" button on the exam administrator screen as shown in FIG. 21, the screen will be shift to a screen as shown in FIG. 22, and on this screen, the exam administrator can input information to be stored in the test condition data file (348) such as opening date and time for the first half test, closing date and time for the first half test, an test duration, an test location, whether the first half test can be paused and resumed, closing date and time for the second half test, the number of the evaluators for each idea. Once input has been completed, through clicking a "Send test conditions" button, the test conditions can be sent to the server (11). In this way, the transmitting and receiving unit (310) in the server (11) can receive the test conditions information sent to the server (11), and the data registration part (322) can store the received information together with a test condition ID in the test condition data file (348). The test condition ID may be manually input by the server administrator individually, or may be automatically assigned according to predetermined rules when the test conditions information is stored in the data registration part (322) by the server (11).

The data registration part (322) may register the exam administrators. When the server administrator (that is, an online test system provider) logins using the server administrator device (15) according to the above procedures, a server administrator screen as shown on the left side in FIG. 23 will be displayed on the server administrator device (15). When the server administrator clicks "Detail" button corresponding to the item desired to be set, a screen to input the exam administrator account information as shown on the right side in FIG. 23 will be displayed on the server administrator device (15), and on the screen, the predetermined exam administrator account information to be stored in the exam administrator account data file (346) such as an organization ID of the exam administrator, person in charge, contact details ID. Once input has been completed, through clicking the "Save" button, the exam administrator account information can be sent to the server (11). In this way, the transmitting and receiving unit (310) in the server (11) can receive the exam administrator account information sent to the server (11), and the data registration part (322) can store the received information in the exam administrator account data file (346).

The data registration part (322) may register the question contents. For example, when the server administrator (that is, an online test system provider) logins using the server administrator device (15) according to the above procedures, a server administrator screen as shown in FIG. 23 will be displayed on the server administrator device (15). When the server administrator clicks "Detail" button corresponding to the "question settings", a screen to input the question content as shown in FIG. 24 will be displayed on the server administrator device (15), and on the screen, the question content can be input on the screen. Once input has been completed, through clicking the "Save" button, the question content can be sent to the server (11). In this way, the transmitting and receiving unit (310) in the server (11) can receive the question content sent to the server (11), and the data registration part (322) can store the received information in the question data file (341).

The data registration part (322) may register the answer contents. For example, when the examinee screen for the first half test testing idea creation skills as shown in FIG. 18 is displayed on the examinee device (12), if the examinee inputs the answer content to the question content and clicks a "Next" button, the answer data from the examinee is sent to the server (11) through the network (14). When the time limit judgement part (324) judges that the answer data including the answer content received at the transmitting and receiving unit (310) is received within the time limit, the data registration unit (322) may assign an idea answer ID to the answer data, and the answer data may be stored in the answer data file (342) in association with the examinee ID of the examinee who has sent the answer data.

The data registration part (322) may register the answer evaluation. For example, when the examinee screen for the second half test evaluating the idea creation skills of another examinee as shown in FIG. 19 is displayed on the examinee device (12), if the examinee inputs the answer evaluation (in this case, clicking either the "good" or "not good" button) and clicks the "Next" button afterward, the answer evaluation data from the examinee is sent to the server (11) through the network (14). When the answer evaluation data is received at the transmitting and receiving unit (310), the data registration part (322) may assign an answer evaluation ID to the answer evaluation data, and the answer evaluation data may be stored in the answer evaluation data file (343) in association with the examinee ID of the examinee who has sent the answer evaluation data and the idea answer ID, etc. In the second half test as well as the first half test, only when the time limit judgement part (324) judges that the answer evaluation data is received within the time limit, the answer evaluation data may be stored in the answer evaluation data file (343).

The question extraction part (323) may extract the question data from the question data file (341), and send the question data in a displayable form to each examinee device (12) simultaneously from the transmitting and receiving unit (310) through the network (14), once the transmitting and receiving unit (310) receives instruction to start the first half test from the exam administrator device (13). In addition, the question extraction part (323) may send the question data individually to a corresponding examinee device (12) according to instruction by the time limit judgement part (324).

The time limit judgement part (324) may use the timer (207) within the server (11) to determine whether or not the receiving time of the answer data at the transmitting and receiving unit (310) sent from the examinee device (12) within the time limit, based on time information such as the test condition ID, the opening date and time for the first half test or the closing time for the first half test stored in the test condition data file (348), etc. As the result of determination, when the receiving time is determined to be within the time limit, the time limit judgement part (324) may instruct the data registration part (322) to assign the idea answer ID to the answer data and to store it in the answer data file (342) in association with the examinee ID of the examinee who has sent the answer data, etc. In addition, the time limit judgement part (324) may instruct the question extraction part (323) to resend the question data in a displayable form from the transmitting and receiving unit (310) to the examinee device (12) of the examinee who has sent the answer data. On the other hand, as the result of determination, when the receiving time was determined to be past the time limit, the time limit judgement part (324) may reject either the sending of the answer data from the examinee device (12) or the receiving of the answer data by the server (11). In addition, irrespective of whether the answer data from the examinee devices (12) was received, when the time limit judgement part (324) determines that the time limit is over, it may send the information that the first half test is over in a displayable form to each examinee device (12) as well as the exam administrator device (13) from the transmitting and receiving unit (310) and reject receiving any answer data beyond the time limit. Furthermore, in order to record that the first half test has been over, the time limit judgement part (324) in the server (11) may change the "status" field in files such as the examinee evaluation data file (344) to "the first half test ended". The time limit judgement part (324) may also send to the evaluator determination part (325) that the first half test ended.

After it is confirmed that the first half test is over by the information that the status has become "the first half test ended" for all the examinees in the examinee evaluation data file (344) etc. or the information that the first half test is over is received from the time limit judgement part (324), once the transmitting and receiving unit (310) receives instruction from the exam administrator device (13) to start the second half test, the evaluator determination part (325) may obtain a random number generated by a random number generator (206) installed in the server (11) and use the random number to determine the examinee who should evaluate the answer content (idea) in each answer data stored in the answer data file (342). Alternatively, after it is confirmed that the first half test is over by the information that the status has become "the first half test ended" for all the examinees in the examinee evaluation data file (344) etc. or the information that the first half test has been over is received from the time limit judgement part (324), the evaluator determination part (325) may automatically obtain a random number generated by the random number generator (206) installed in the server (11) and use the random number to determine the examinee who should evaluate the answer content (idea) in each answer data stored in the answer data file (342), without waiting for the instruction from the exam administrator device (13) to start the second half test. This may allow shortening the test duration.

In order to determine which idea(s) are to be evaluated by which examinee(s), the evaluator determination part (325) may assign a necessary number of examinee ID(s) to each idea answer ID among examinee IDs for all the examinees by using the random numbers. Once the examinees who should evaluate each idea are determined, the evaluator determination part (325) may store each idea answer ID in association with the examinee ID(s) of the evaluator(s) in the answer data file (342), etc. within the memory device (340). In addition, the evaluator determination part (325) may also store examinee ID, idea answer ID to be evaluated, and the necessary number of evaluation(s) in association with each other for each examinee as evaluator in the second half test progress management data file (349), which is responsible for managing the progress of the evaluation for each answer content by each examinee as evaluator.

An example of a procedure for evaluator determination by the evaluator determination part (325) will be described. The evaluator determination part (325) may count the total number of answer data of all examinees, and use the following equation to calculate the maximum allocation number of the answer data (idea) allocated to each examinee as evaluator. The calculation result may be rounded up to an integer.

Maximum allocation number=(Total number of idea) *(Number of evaluators per idea)/(Number of all examinees).

The variable for the number of evaluators per idea may be the "Number of evaluators per idea in the second half test" field in the test conditions data file (348).

It is preferable that the evaluator determination part (325) may refer to the answer data file (342), and if the examinee ID of the examinee who has sent a certain answer (idea) matches the examinee ID of the examinee who should evaluate the answer (idea) selected by the random number, then the evaluator determination part (325) may cancel the selection and reperform selection of evaluator using the random number. Furthermore, if an examinee of a specific examinee ID is selected more times than the maximum allocation number, the evaluator determination part (325) may cancel the selection and reperform selection of evaluator using the random number. In such a way of selecting evaluators, all evaluators can be assigned either "Maximum allocation number" or "Maximum allocation number−1" of ideas to evaluate.

In addition, in order to allow a single answer data (idea) to be evaluated by a wide variety of examinees, the evaluator determination part (325) may preferably classify the examinees into several groups in advance in the following procedures. The evaluator determination part (325) refers to the answer data file (342) and calculate a total number of unique combinations of options answered by each examinee (e.g. a total number of combinations of "who", "when", "where", "what") based on the examinee ID and selected options. As a result, the examinee may be ranked in descending order of the total number of unique combinations of options. In case where there are multiple examinees with the same ranking, the random numbers can be allocated so that each examinee will be assigned a different ranking. The examinees are arranged using the examinee ID based on the resulting rank, and classified into the groups of the number of "Number of evaluators per idea". After the classification, one examinee to evaluate each answer data can be selected from each group by the random numbers in the same procedure as described above. In this way, simply ranking the examinees in descending order of the total number of ideas can facilitate obtaining less biased evaluation results than selecting the examinees to evaluate without classification.

Following the determination of the examinees to evaluate by the evaluator determination part (325), the answer extraction part (326) may extract the answer contents (ideas) to be evaluated by each examinee based on the idea answer ID and the examinee ID of the examinee as evaluator that are stored in the answer data file (342). The answer extraction part (326) may then send the extracted answer contents in a displayable form to each examinee device (12) from the transmitting and receiving unit (310) via the network (14). The necessary number of answer data including the answer contents (idea) may be sent to each examinee to evaluate all at once or separately.

When the server (11) receives one evaluation for one answer content from the examinee, the evaluation number judgement part (332) in the server (11) may increase the number of completed evaluations by one in association with the examinee ID of the examinee who sent the evaluation in the second half test progress management data file (349). The evaluation number judgement part (332) may track the progress of the second half test of each examinee through comparing the number of completed evaluations with the necessary number of evaluations. In case where the necessary number of the answer data are sent separately to each examinee, the evaluation number judgement part (332) may judge whether each examiner has evaluated the necessary number of the answer contents based on the above determination. In case where the evaluation number judgement part (332) judges that the examiner has not reached the necessary number of evaluations yet, it may instruct the answer extraction part (326) to extract the answer data which has not been evaluated yet (the answer content which should be evaluated next time by the examinee) based on the idea answer ID and the examinee ID of the examinee as evaluator stored in the answer data file (342), and it may send the answer content in a displayable form to a corresponding examinee device (12) from the transmitting and receiving unit (310) via the network (14). In case where the evaluation number judgement part (332) judges that a certain examinee has reached the necessary number of evaluations, the evaluation number judgement part (332) may send from the transmitting and receiving unit (310) to the examinee device (12) and the exam administrator device (13) the second half test completion screen or the progress information that the second half test has been over. At this time, in order to record that the second half test has been over, the evaluation number judgement part (332) may change the status in the examinee evaluation data file (344) and the like to "the second half test ended".

The answer evaluation part (327) may aggregate the evaluations of the answer contents per idea answer ID of each answer data, based on each answer evaluation and idea answer ID stored in the answer evaluation data file (343). For example, when evaluating each answer content as a choice between good and bad, a predetermined score, such as good=1, bad=0, is given to each evaluation, and a simple arithmetic mean value may be regarded as a score for the answer content (idea). The answer evaluation part (327) may store the aggregated score for each idea answer ID in the answer data file (342) as "Calculated Score 1".

However, the ability of each examinee as evaluator of evaluating ideas cannot be recognized at this point. Therefore, even though good ideas may have been generated, evaluations for such ideas may be split between examinees with good evaluation ability and those with poor evaluation ability. For this reason, instead of treating the evaluations from all examinees equally, it is preferable to adjust the evaluations through applying a weightage system. A method of giving a weight to the evaluation includes that the examinee evaluation part (328) calculates a total score for each examinee based on the score calculation result, ranks the examinees based on the examinee ID and the total scores associated with the examinee ID, and the evaluation of answer content associated with the examinee ID with a higher rank is more highly weighted. This method is based on the assumption that the examinee who has higher evaluated idea creation skill also has higher evaluation ability. In such a way, weighting the evaluations, re-evaluating the answer contents based on the weighted evaluations, re-ranking the examinees and adjusting the total scores based on the adjusted scores. This adjustment may be conducted at least one time, preferably at least 5 times, and more preferably at least 10 times. As a result, the evaluations by the examinees who seems to have higher evaluation ability can be largely reflected to the total score (idea score) of each examinee. FIG. 3 shows a conceptual diagram showing a repetition of ranking of ideas and mutual evaluation.

The following explains a concrete example of how weightage may be applied. Firstly, the examinee evaluation part (328) calculates the total score per examinee using the "Calculated Score 1" explained above. Secondly, the examinee evaluation part (328) sorts all examinees based on the above calculated total scores. Provided that N represents the number of all examinees, the weightage given to an examinee who is ranked no. k (k being from 1 to N) can be calculated with the below equation.

$$\text{Weightage}=1+\text{Sin}\ \{(1-2*(k-1)/(N-1))*pi/2\}$$

Using this equation, a weightage coefficient can be given to each examinee ID. In this example, the highest ranked examinee's evaluations will have a weightage coefficient of 2 whereas the lowest ranked examinee's evaluations will have a weightage coefficient of 0.

After the above weightage, the "Calculated Score 1" stored in the answer data file (342) which represents the score for each answer content should be recalculated based on the calculated weightage coefficients. For example, if evaluation of each answer content given as a choice between "good" and "bad", while "good"=1 is given at the beginning, through multiplying the weightage coefficient (e.g. the above Weightage), the post-weighted "good" may take values such as "good"=0.5 or "good"=1.6 depending on the examinee ID of examinee as evaluator.

According to the above weightage method, the score for each answer content can be adjusted from a simple arithmetic average to a value calculated based on the following equation considering the weightage.

$$(\text{Weighted average})=(\text{Total weighted score})/(\text{Total weightage})$$

$$\text{Total weightage}=\Sigma(\text{weightage})$$

$$\text{Total weighted score}=\Sigma(\text{weightage}*1 \text{ or } 0)$$

The "Total weightage" above refers to the total of the weightage coefficients of the examinees evaluating the answer content. The "Total weighted score" refers to the total of values each obtained by multiplying the weightage coefficient of each examinee evaluating the answer content by an evaluation value given by the examinee.

The adjusted scores may be stored in the answer data file (342) as "Calculated Score 2".

The examinee evaluation part (328) may calculate the total score per each examinee ID based on each score (it may be an adjusted score after the weightage above) given to the answer content per idea answer ID stored in the answer data file 342 and the examinee ID corresponding to the answer content. The examinee evaluation part (328) may then store the total score in the examinee in the examinee evaluation data file (344).

During this calculation, it is preferable that the score (evaluation value of idea) given to each answer content and stored in the answer data file (342) is weighted according to at least one of the following weighting criteria of (1) to (3)

(1) A plurality of the answer data for the same examinee ID is classified into each combination of the options and if there is a plurality of the idea answer IDs containing the same combination of the options, the score given to each answer is weighted such that the answer with a lower score obtains a lower weighting.

This weighting criterion enables to prevent examinee(s) from inflating their scores through giving many answer contents to the same combination. In other words, the weighting criterion of (1) is suitable for evaluating the quantity of ideas created by examinees.

A concrete example of how the weighting criterion of (1) may be applied in the calculation of the total score for each examinee is as follows.

A plurality of the answer data for the same examinee ID is classified into each combination of the options and if there is a plurality of the idea answer IDs containing the same combination of the options, the plurality of the answer data is sorted in descending order of the score given to each answer content.

Each score for the answer data sorted in descending order k=1, 2, - - - , n is multiplied by a pre-defined coefficient to obtain a total score for each combination. It is recommended for the purpose of evaluating the quantity of idea creation to set an upper limit to the total score for each combination. The total score with upper limit can be calculated utilizing geometric progression as described in the following equation.

$$\text{Total score with upper limit}=\Sigma\{(\text{Score given to each answer content})*(\text{attenuation coefficient})^{k-1}\}$$

This attenuation coefficient can be arbitrarily set, with examples for this coefficient possibly being ½ or ⅔

The total score for each combination of the options is determined as above and a summation of each of the total score can be regarded as a total score for the examinee corresponding to the examinee ID.

(2) For a plurality of the answer data tagged with the same examinee ID, each of the combination of the options is quantified on a coordinate for calculation of its center point, and the score given to each answer content is weighted such that the answer content including the combination of the options with a longer distance from the center point obtains a higher weighting.

This weighting criterion easily enables examinee(s) who has provided a wide range of combinations of options to obtain higher score. This weighting criterion is thus suitable for evaluating the variety of ideas created by examinees.

A concrete example of how the weightage criterion in (2) may be applied in the calculation of the total score for each examinee is as follows.

In order to quantify a plurality of the answer data tagged with the same examinee ID on a coordinate and to calculate its center point, the number of each option is converted to a set of 1s or 1s in the first place. For example, in case where there are four elements of "Element 1 (What)", "Element 2 (When)", Element 3 (Where) and Element 4 (What) with five options of 1 to 5 per element, the numbers for each option for Element 1 may be coded as (1,0,0,0,0), (0,1,0,0, 0), (0,0,1,0,0), (0,0,0,1,0) and (0,0,0,0,1) respectively. The options for Element 2, Element 3 and Element 4 are coded in the same way, too. In this way, all the possible option combinations can be expressed with 20 combinations using an array of 0s and 1s. For example, if a certain answer data indicates a combination of options as (Element 1, Element 2, Element 3, Element 4)=(1,4,2,5), this is converted to [(1,0,0,0,0),(0,0,0,1,0),(0,1,0,0,0),(0,0,0,0,1)].

For all the answer data tagged with the same examinee ID, an array denoting the arithmetic average of the arrays is calculated. The calculated array is an array of 20 floating decimal numbers with values each ranging from 0 to 1. For example, if an examinee provides five ideas, a possible center point can be represented by ((0,1/5,2/5,0,2/5), (0,1, 0,0,0), (1/5,1/5,1/5,1/5,1/5), (1/5,1/5,0,0,3/5)), each being an average array of 0s and 1s.

Next, a square of the distance from the center point is calculated for each combination of options represented by an array of 0s and 1s. The square of the distance can be a summation of square of difference between corresponding factors. For example, if the average array of 0s and 1s (the center point) is represented by {(0,1/5,2/5,0,2/5), (0,1,0,0,0), (1/5,1/5,1/5,1/5,1/5), (1/5,1/5,0,0,3/5)} and a combination of options is represented by {(1,0,0,0,0),(0,0,0,1,0),(0,1,0,0,0), (0,0,0,0,1)}, the square of the distance between the two can be calculated as an Euclidian distance i.e. $[\{(0-0)^2+(1-1/5)^2+(1-2/5)^2+(0-0)^2+(0-2/5)^2\}+\{(0-0)^2+(1-1)^2+(0-0)^2+(0-0)^2+(0-0)^2\}+\{(0-1/5)^2+(1-1/5)^2+(0-1/5)^2+(1-1/5)^2+(1-1/5)^2\}+\{(0-1/5)^2+(1-1/5)^2+(0-0)^2+(0-0)^2+(1-3/5)^2\}]$.

In this way, the square of the distance from the center point for each of all the answer data of a certain examinee is calculated. The score given to each answer data is multiplied by the square of its distance from the center point to calculate a weighted total score. This weighted total score is divided by a simple summation of the scores given to each answer data of the examinee to calculate a weighted average score.

(Weighted average score)=Σ{(Score given to each answer content)*(Square of Distance)}/Σ(Score given to each answer content)

This weighted average score is taken as a total score for the examinee corresponding to the examinee ID.

(3) A total acquired score for each of all the combinations of the options assumed from the question content is calculated by summing up scores that are associated with the identifier of the answer data including each combination of the options as the answer content, and the score given to each answer content is weighted such that the answer content including the combination of the options with a lower total acquired score obtains a higher weighting.

This weighting criterion enables examinee(s) to obtain higher scores when the examinee(s) has received a high evaluation for the combination(s) of the options which is difficult to receive a high evaluation. This weighting criterion is thus suitable for finding examinee(s) who is able to create rare ideas.

A concrete example of how the weightage criterion in (3) may be applied in the calculation of the total score for each examinee is as follows.

A total acquired score for each of all the combinations of the options assumed from the question content is calculated. For example, in case where there are four elements of "Element 1 (What)", "Element 2 (When)", Element 3 (Where) and Element 4 (What) with five options of 1 to 5 per element, there are in total $5^4=625$ possible combinations of the options. The total acquired score for each of the 625 combinations is calculated. It is assumed that a combination of the options with a lower total acquired score is more difficult to receive a high evaluation. All the combinations are sorted in descending order based on their total acquired scores. For example, with the top scoring combination being ranked first and the lowest scoring being ranked 625.

Next, based on the resulting ranks of the combinations, the weighted average score is calculated per examinee ID according to the following equation.

(Weighted average score)=Σ((Score given to each answer content)*(Rank of the combination corresponding to the answer content))/Σ(Score given to each answer content)

This weighted average score is taken as a total score for the examinee corresponding to the examinee ID.

The examinee evaluation extraction part (329) may extract the examinee evaluation data including the total score for each examinee stored in the examinee evaluation data file (344) based on the examinee ID, and send the examinee evaluation data in a displayable form to the corresponding examinee device (12) through the network (14) from the transmitting and receiving unit (310). FIG. 20 shows an example of the scoring result displayed on the examinee device (12). The scoring result may be the total score(s) itself calculated using the above procedure(s) but may be displayed as other measures (such as standard deviation value) through conversion or adjustment. In addition, the scoring result may be converted to and displayed as evaluation by category (e.g. idea creation skills "High", "Normal", "Low" etc.) based on the total score(s).

The evaluation accuracy calculation part (330) may compare the evaluation of each answer content stored in the answer evaluation data file (343) in association with the examinee ID of the examinee as evaluator, with the post-adjustment score (e.g. data field named "Calculated Score 3" etc.) of the answer content stored in the answer data file (342). The evaluation accuracy calculation part (330) then aggregates the results of comparison between them for each examinee to calculate the evaluation accuracy for each examinee. The evaluation accuracy calculation part (330) may store the evaluation accuracy in association with the examinee ID of each examinee in the examinee evaluation data file (344).

A concrete example of how the evaluation accuracy is calculated is detailed below. All the answer contents evaluated by each examinee are sorted in either descending (or ascending) order of evaluation score given by the examinee. The corresponding answer contents evaluated by the examinee are also sorted in either descending (or ascending) order based on the pre-adjustment or post-adjustment scores, preferably the post-adjustment scores stored in the answer data file (342). Each evaluation by the examinee as evaluator is given a score such that the evaluation with closer approximation between each rank receives higher score, and the total score is summed up. The total score is a basis for the evaluation accuracy score. The evaluation accuracy score may be displayed as other measures (such as standard deviation value) through conversion or adjustment. In addition, the evaluation accuracy score may be converted to and displayed as evaluation accuracy by category (e.g. ability as evaluator "High", "Normal", "Low" etc.). An example of adjustment method includes calculating an expected value when an examinee evaluates the answer contents in a random fashion under a given test condition and defining the adjusted evaluation accuracy score as follows: (Adjusted evaluation accuracy score)={(evaluation accuracy score before adjustment)−(expected value)}/{1−(expected value)}.

The following explains how to calculate the evaluation accuracy score in case where evaluation is made by a choice between "Good" and "Not good". Let a and b represent the number of answers evaluated as "Good" and "Not good" respectively by an examinee with N representing the total number of evaluated answers which equals a+b. These values are calculable using the answer evaluation and the examinee ID of the examinee as evaluator per answer evaluation ID stored in the answer evaluation data file (343).

Next, the N answer contents (ideas) which the examinee has evaluated are sorted in descending order based on the post-adjustment score (evaluated score) stored in the answer data file (342).

When ideas are sorted in descending order of evaluated score, if the examinee evaluates as "Good" for the ideas ranked k=from 1st to ath, then the evaluations are regarded as "correct" and if the examinee evaluates as "Not good" for them, then the evaluations are regarded as "incorrect". At this time, the evaluations may be weighted such that the evaluation accuracy score will be higher if the examinee evaluates as "Good" for the ideas that are given a high evaluated score. Specifically, for each of "a" number of the "Good" evaluations given by the examinee as evaluator, "Extra point={(a−k+1)/a}" may be added to the base score for a "correct" or "incorrect" evaluation. For example, if the examinee evaluates the idea ranked 1st as "Good" an extra 1 point is added, if the examinee evaluates the idea ranked ath as "Good" an extra 1/a points is added.

Furthermore, if the examinee evaluates as "Good" for the ideas ranked k=from (a+1)th to (a+b)th, then the evaluations are regarded as "incorrect" and if the examinee evaluates as "Not Good" for them, then the evaluations are regarded as "correct". At this time, the evaluations may be weighted such that the evaluation accuracy score will be higher if the examinee evaluates as "Not good" for the ideas that are given a low evaluated score.

Specifically, for each of "b" number of the "Not good" evaluations given by the examinee as evaluator, "Extra point={(k−a)/b}" may be added to the base score for a "correct" or "incorrect" evaluation. For example, if the examinee evaluates the idea ranked (a+1)th as "Not good" an extra 1/b point is added, if the examinee evaluates the idea ranked (a+b)th as "Not good" an extra 1 point is added.

In this way, the examinee's temporary evaluation accuracy score may be defined according to the equation (Score for "correct" evaluation)/(Score for "correct" evaluation+Score for "incorrect" evaluation).

On the other hand, if an examinee evaluates in a random fashion, the expected value is represented by the following equation: (Expected value)=$(a^2+b^2)/(a+b)^2$. Therefore, the evaluation accuracy score is adjusted by the following equation:

(Adjusted evaluation accuracy score)={(Temporary evaluation accuracy score)−(Expected value)}/{1−(Expected value)}

The adjusted evaluation accuracy score may be taken as the evaluation accuracy score of the examinee as evaluator.

The operations performed by the above-mentioned parts of the server can facilitate to evaluate each examinee with regard to the idea creation skills and the ability as evaluator. However, the same idea of the same examinee might be evaluated differently depending on the organization which the examinee belongs to. Therefore, in order to reduce the difference of evaluation due to the difference of organizations, it is preferable that the scoring results of examinees are standardized.

Example of standardization methods include modifying the average of the total scores for a particular group of examinees to the average of the total scores for sample examinees, and modifying the standard deviation of the total scores for a particular group of examinees to the standard deviation of the total scores for sample examinees. In the former case, the score standardization part (331) calculates an average value A1 of the total scores for all the examinees including the sample examinees or not including the sample examinees, based on the total score for each examinee calculated by the examinee evaluation part 328. The score standardization part (331) also calculates an average value A2 of the total scores for the sample examinees based on the total scores for the sample examinees calculated by the examinee evaluation part 328. The score standardization part (331) calculates a difference between A1 and A2 and subtracts the difference between A1 and A2 from each of the total scores for the examinees such that the average value of the total scores for all the examinees is modified from A1 to A2 to obtain a subtracted total score for each examinee. The score standardization part (331) stores the subtracted total score for each examinee in the examinee evaluation data file 334 in association with the identifier of the examinee. In the latter case, the score standardization part (331) calculates a standard deviation D1 of the total scores for all the examinees including the sample examinees or not including the sample examinees based on the total score for each examinee calculated by the examinee evaluation part 328. The score standardization part (331) also calculates a standard deviation D2 of the total scores for the sample examinees based on the total scores for the sample examinees calculated by the examinee evaluation part 328. The score standardization part (331) calculates a ratio of D1 and D2, and multiplies a difference between the total score for each examinee and the average value A1 by the ratio of D1 and D2 such that the standard deviation for all the examinees is modified from D1 to D2 for obtaining each multiplication value. The score standardization part (331) adds the multiplication value to the average value A1 for obtaining a standardized total score for each examinee, and may store the standardized total score for each examinee in the examinee evaluation data file (344) in association with the identifier of the examinee.

Furthermore, the procedure for the average score standardization may be combined with the procedure for the standard deviation standardization in order to modify the average of the total scores for all the examinees from A1 to A2 and modify the standard deviation for all the examinees from D1 to D2. In case of combination, the score standardization part (331) calculates a standard deviation D1 of the total scores for all the examinees including the sample examinees or not including the sample examinees based on the total score for each examinee calculated by the examinee evaluation part 328. The score standardization part (331) also calculates a standard deviation D2 of the total scores for the sample examinees based on the total scores for the sample examinees calculated by the examinee evaluation part 328. The score standardization part (331) calculates a ratio of D1 and D2, and multiplies a difference between the total score for each examinee and the average value A1 by the ratio of D1 and D2 such that the standard deviation for all the examinees is modified from D1 to D2 for obtaining each multiplication value, The score standardization part (331) adds the multiplication value to the average value A2 for obtaining a standardized total score for each examinee, and may store the standardized total score for each examinee in the examinee evaluation data file (344) in association with the identifier of the examinee,

[Examinee Device(s)]

The examinee device(s) (12) may also contain the hardware structure of the computer (200) mentioned earlier. The memory device (202) in the examinee device(s) (12) may either permanently or temporarily store programs such as the web browser, in addition to data such as browser data and data transmitted from/to the server (11) (e.g. question data, answer data, answer evaluation data and examinee evaluation data, etc.). The input device (204) of the examinee device(s) (12) enables to input login information, answer to question, and evaluation of answer by other examinees, etc. The output device (203) of the examinee device(s) (12) enables to display login screen, question content, his/her own answer, other's answer, evaluation results etc. The communicating device (205) of the examinee device(s) (12) enables to communicate with the server (11) through the network (14). For example, the examinee device(s) (12) can receive the login screen, question data, answer data and examinee evaluation data from the server (11), and can send login information, answer data and answer evaluation data to the server (11).

[Exam Administrator Device]

The exam administrator device (13) may also contain the hardware structure of the computer (200) mentioned earlier. The memory device (202) in the exam administrator device (13) may either permanently or temporarily store programs such as the web browser, in addition to data such as browser data and data transmitted from/to the server (11) (e.g. examinee account information, data related to status (progress) of the test, question data, answer data, answer evaluation data and examinee evaluation data, etc.). The input device (204) of the exam administrator device (13) enables to input examinee account information, login information, and instruction to start the test. The output device (203) of the exam administrator device (13) enables to display examinee account information, login screen, question content, answer by examinee, evaluation result, etc. The communicating device (205) of the exam administrator device (13) enables to communicate with the server (11) through the network (14). For example, the exam administrator device (13) can receive the login screen, examinee account information, question data, answer data, examinee evaluation data, and status information of the test from the server (11), and can send test conditions information (including the instruction to start the test), examinee account information and login information to the server (11).

[Server Administrator Device]

The server administrator device (15) may also contain the hardware structure of the computer (200) mentioned earlier. The memory device (202) in the server administrator device (15) may either permanently or temporarily store programs such as the web browser in addition to data such as browser data and data transmitted from/to the server (11) (e.g. server administrator account information, exam administrator account information, examinee account information, data related to status (progress) of the test, question data, answer data, answer evaluation data and examinee evaluation data, etc.). The input device (204) of the server administrator device (15) enables to input server administrator account information, exam administrator account information, login information, and question content. The output device (203) of the server administrator device (15) enables to display server administrator account information, exam administrator account information, login screen, question content, answer by examinee, evaluation result, etc. The communicating device (205) of the server administrator device (15) enables to communicate with the server (11) through the network (14). For example, the server administrator device (15) can receive the login screen, server administrator account information, exam administrator account information, examinee account information, question data, answer data, examinee evaluation data, and status information of the test from the server (11), and can send server administrator account information, exam administrator account information, examinee account information, and login information to the server (11).

<2. Flow of Online Test>

Next, the procedure of the method of the online test by the above system will be described with reference to a flowchart.

2-1 From the Input of Test Conditions to the Start of the First Half Test

FIG. 25 is a flowchart which indicates the processes from the point when the exam administrator accesses the server to register examinees and input test conditions to the point when the screen of the test for idea creation skills (the first half test) is displayed on the examinee device. When the exam administrator accesses the server (11) by inputting a designated URL on the exam administrator device (13), the server (11) sends the login screen to the exam administrator device (13) (S101). Next, the exam administrator inputs his/her ID and password on the exam administrator device (13) and clicks on the login button (S102). The authentication processing part (321) in the server (11) determines whether or not the input administrator ID and password match the data stored in the exam administrator account data file (346) (S103). In case where they match, the authentication processing part (321) sends the exam administrator management screen to the exam administrator device (13) (S104), and if they do not match, it sends an error message instead (S105).

Once the login succeeds, the management screen (e.g. as shown in FIG. 21 and FIG. 22) is displayed on the exam administrator device (13). The exam administrators use this management screen to input the test conditions and the examinees' information and send this information to the server (11) (S106). Once the server (11) receives the examinees' information and the test conditions, these data are stored in the examinee account data file (345) and the test conditions data file (348) respectively by the data registration part (322) (S107). Next, the server (11) sends a management screen which indicates the registered examinee information and test conditions to the exam administrator device (13) (S108). The exam administrator then confirms the registered information on the management screen, and clicks on a "The first half test start" button as shown in FIG. 21, in order to send an instruction for the test to start to the server (11) (S109). Once the instruction to start the first half test is received from the exam administrator device (13), the question extraction part (323) in the server (11) changes and store the status in order to indicate that the first half test has started in the examinee evaluation data file (344), etc. (S110). The start time of the first half test may also be stored in the examinee evaluation data file (344), etc. When other files such as the test account data file (345) and the test condition data file (348) also have a field for status, such a field is also changed. Incidentally, the instruction to start the first half test by the exam administrator may include not only clicking on the "the first half test start" button, but also registering the start date and time of the first half test in advance in the server (11). In this scenario, the server (11) automatically performs S110 at the designated date and time.

Next, the server (11) extracts the question data from the question data file (341) and sends the first half test screen including the question data to the examinee devices (12) (S111). Thus, the first half test screen, which includes the fields to input 5W1H options and the fields to input needs and idea corresponding to the 5W1H options as shown in FIG. 18, is displayed on the examinee devices (12) (S112). Although the explanation by the flowchart is omitted, in order to display the first half test screen on the examinee device (12), the examinee device (12) is also required to be logged in by being authorized through ID and password in the same procedure as the exam administrator device (13).

2-2 From Start to End of the First Half Examinee ID

FIG. 26 is a flowchart which indicates the processes from the point when the first half test starts to the point when it ends. After the first half test screen is displayed on the examinee devices (12) following the above procedures, each examinee may input an answer content to the question content and clicks on the "Next" button on the screen. The answer data is then sent from the examinee device (12) to the server (11) (S113). Once the server (11) receives the answer data, the time limit judgement part (324) determines whether the answer data including the answer content was received within the time limit (S114).

If it is determined that it is within the time limit, the data registration part (322) assign an idea answer ID to the answer data and store the idea answer ID in the answer data file (342) in association with the examinee ID of the examinee who has sent the answer data and the like (S115). In addition, if it is determined that it is within the time limit, the time limit judgement part (324) instructs to resend the first half test screen to the examinee device (12) of the examinee who has sent the answer data (S111). The question extraction part (323) sends the first half test screen to the corresponding examinee device (12) according to the instruction by the time limit judgement part (324). In this way, as long as it is within the time limit, the first half test screen may be sent to the examinee devices (12) repeatedly.

On the other hand, if the time limit judgement part (324) in the server (11) determines that the time limit has passed, regardless of whether the answer data is received from the examinee devices (12), in order to record the end of the first half test, the time limit judgement part (324) changes the status field in the files such as the examinee evaluation data file (344) to "first half test ended" (S116). Furthermore, the time limit judgement part (324) sends either the first half test completion screen or the progress information that the first half test has been over to both the examinee devices (12) and the exam administrator device (13) (S117). Thus, the screen indicating the first half test has been over is displayed on the examinee devices (12) (S118) and for instance the progress status information as shown in FIG. 21 is displayed on the exam administrator device (13) (S119).

Alternatively, the server (11) may send the first half test screen which allows the examinees to input a plurality of answer contents at once in S111. Each examinee device (12) may send a plurality of answer contents to the server (11) at once in S113. In this scenario, the server (11) can receive all answer data at once, and S111 does not need to be repeated.

2-3 From Start to End of the Second Half Test

FIG. 27 is a flowchart which indicates the processes from the point when the second half test starts to the point when it ends. After the first half test is over following the above procedures, the exam administrator may click on the "Start the second half test" button on the management screen as shown in FIG. 21, in order to send an instruction to start the second half test to the server (11) (S201). Once the instruction to start the second half test is received, the evaluator determination part (325) in the server (11) obtain random numbers generated by the random number generator (206) and use the random numbers to determine examinee(s) who should evaluate the answer content (idea) of each answer data stored in the answer data file (342). (S202). At this time, the evaluator determination part (325) may store the examinee ID, idea answer ID(s) to evaluate and the necessary number of evaluations for each examinee as evaluator in association with each other in the second half test progress management data file (349), which is responsible for managing the progress of the evaluations of each answer content by the examinees as evaluator. Incidentally, the determination process by the evaluator determination part (325) is not limited to be performed by the instruction to start the second half test from the exam administrator device (13), but may be performed by some sort of instructions to start the evaluator determination process. For example, the determination process may be triggered by the instruction only for determination of the evaluators from the exam administrator device (13), as well as by the instruction together with other instructions, or may be triggered when the status is changed to "the first half test ended".

According to the determination of the examinees who should evaluate each answer content by the evaluator determination part (325), the answer extraction part (326) extracts the answer contents (ideas) to be evaluated by each examinee based on the idea answer ID and the examinee ID of examinee as evaluator stored in the answer data file (342), and sends the answer contents to the corresponding examinee device (12) (S203). The screen of answer content to be evaluated by each examinee is displayed on the examinee device (12) as shown in FIG. 19 (S204). The examinee clicks on the evaluation button ("Good" or "Not good") of the answer content and clicks on the "Next" button on the screen. Following this, the answer evaluation data is sent to the server (11) from the examinee device (12) (S205). Once the server (11) receives the answer evaluation data, the data registration part (322) assigns an answer evaluation ID to the answer evaluation data and stores it in the answer evaluation data file (343) in association with the examinee ID of the examinee who has sent the answer evaluation data and the idea answer ID, etc. (S206).

Subsequently, each time an evaluation for a single answer content is received from each examinee device (12), the evaluation number judgement part (332) in the server (11) increases the number of completed evaluations by one in the second half test progress management data file (349) tagged with the examinee ID of the examinee who has sent the evaluation, and the evaluation number judgement part (332) judges whether the examinee has reached the necessary number of evaluations according to the above determination (S207). In case where it is judged that the examinee has not reached the necessary number of evaluations yet, the answer extraction part (326) extracts the answer data which has not been evaluated yet (the answer content which should be evaluated next time by the examinee) based on the idea answer ID and the examinee ID of the examinee as evaluator stored in the answer data file (342), and send the answer data to the corresponding examinee device (12) (S203). In this way, the second half test screen is repeatedly sent to the examinee devices (12) until the examinees reach the necessary number of evaluations.

On the other hand, in case where it is judged that the examinee has reached the necessary number of evaluations, the evaluation number judgement part (332) in the server (11) change the status in the examinee evaluation data file (344) and the like to "the second half test ended" in order to record that the second half test has been over for the examinee (S208). Furthermore, the evaluation number judgement part (332) sends the second half test completion screen or the progress information that the second half test has been over to both the examinee device (12) and the exam administrator device (13) (S209). Once the screen or the progress information is received by the examinee device (12) and the exam administrator device (13), the screen indicating that the second half test has been over is displayed on the examinee device (12) (S210), and for instance the progress information as shown in FIG. 21 is displayed on the exam administrator device (13) (S211).

2-4 Score Calculation

FIG. 28 is a flowchart which indicates the processes of scoring the examinees by the server (11) after the idea evaluation test (the second half test) ends and sending the results to both the examinees and as the exam administrator. After the second half test is over following the above procedures, the exam administrator sends an instruction to start the score calculation from the exam administrator device (13) to the server (11) by clicking on the "Start score calculation" button on the management screen as shown in FIG. 21 (S301). Note that the "Start score calculation" button may appear on the management screen of the exam administrator after the second half test is over. Next, once the instruction is received by the server (11), the answer evaluation part (327) in the server (11) calculates the evaluation score of the answer content per idea answer ID in each answer data based on each answer evaluation and idea answer ID stored in the answer evaluation data file (343) (S302). Next, the examinee evaluation part (328) calculates the score of the idea creation skills for each examinee ID based on the score given to each idea answer ID (S303).

After calculating the score of idea creation skills for each examinee in this way, the evaluation score for the answer content is recalculated (adjusted) per idea answer ID such that the evaluations by the examinees having higher scores are more highly weighted (S304), and the adjusted score is used to recalculate (adjust) the score per examinee ID (S305). S304 and S305 are repeated a predetermined number of times.

Through repeating steps S304 and S305 the predetermined number of times, the final score of idea creation skills for each examinee as well as the final score of evaluation for each answer content can be calculated. The evaluation accuracy calculation part (330) in the server (11) compares the evaluation score for each answer content associated with the examinee ID of each examinee as evaluator with the final score of the answer content, and then aggregates approximation between them per examinee to calculate the score of the ability as evaluator for each examinee (S306).

In this way, once the final score of the idea creation skills and the score of the ability as evaluator for each examinee have been calculated, the examinee evaluation extraction part (329) generates a display screen including the scoring result and sends the screen to the corresponding examinee device (12) (S307). The scores may be sent after standardization. Furthermore, the examinee evaluation extract part (329) sends the calculation result screen(s) containing the scores of all examinees to the exam administrator device (13) (S307). Once the screen(s) is received on the examinee device (12) and the exam administrator device (13), the scoring result screen(s) as shown in FIG. 20 is displayed (S308, S309). The scoring result screen(s) may display not only the score per category, but also display a plot of the idea distribution of each examinee vs. that of all examinees on a multidimensional space.

REFERENCE SIGNS LIST

11 server
12 examinee device(s)
13 exam administrator device
14 network
15 server administrator device
200 computer
201 processing device
202 memory device
203 output device
204 input device
205 communicating device
206 random number generator
207 timer
310 transmitting and receiving unit
320 control unit
321 authentication processing part
322 data registration part
323 question extraction part
324 time limit judgement part
325 evaluator determination part
326 answer data extraction part
327 answer evaluation part
328 examinee evaluation part
329 examinee evaluation extraction part
330 evaluation accuracy calculation part
331 score standardization part
332 evaluation number judgement part
340 memory device
341 question data file
342 answer data file
343 answer evaluation data file
344 examinee evaluation data file
345 examinee account data file
346 exam administrator account data file
347 server administrator account data file
348 test conditions data file
349 evaluation stage progress management file

The invention claimed is:

1. A method of an online test for evaluating idea creation skills over a network including at least an exam administrator device, a server including at least one processor, and one or more examinee device, the method comprising:

receiving, by the server, an instruction to start the online test from the exam administrator device through the network;

in response to the instruction to start the online test, extracting, by the server, a question data from a question data memory part, and sending, by the server, the question data to each examinee device through the network, wherein the question data includes a question content for each examinee to choose a situation setting by combining at least two elements selected from a group of six elements including Who, What, Where, When, Why, and How (5W1H) provided that there is a plurality of options for each of the selected elements, and to describe an idea corresponding to the situation setting;

receiving, by the server, an answer data including an answer content to the question content from each examinee device;

assigning, by the server, an answer data identifier to each of the answer data including the answer content received within a time limit predetermined by a timer;

storing, by the server, the answer data in an answer data memory part in association with an examinee identifier of a creating examinee who has sent the answer data;

obtaining, by the server, a random number generated by a random number generator and using, by the server, the random number to determine an evaluating examinee who should evaluate the answer content in each of the answer data stored in the answer data memory part;

extracting, by the server, the answer data to be evaluated by the evaluating examinee from the answer data memory part in accordance with a result of determining the evaluating examinee who should evaluate the answer content and sending, by the server, the answer data to each examinee device of the evaluating examinee through the network;

receiving, by the server, the answer evaluation data including an evaluation by the evaluating examinee of the answer content in the answer data;

assigning, by the server, an answer evaluation data identifier to each of the received answer evaluation data and storing the answer evaluation data in an answer evaluation data memory part in association with an examinee identifier of the evaluating examinee who has sent the answer evaluation data, the answer evaluation data identifier of the answer data that has been evaluated, and the examinee identifier of the creating examinee who has sent the answer data that has been evaluated;

aggregating, by the server, the evaluation of the answer content in each answer data based on each answer evaluation data and the answer evaluation data identifier of the answer evaluation data stored in the answer evaluation data memory part;

calculating, by the server, a score for each answer content, and storing, by the server, the score in the answer data memory part in association with the examinee identifier of the creating examinee who has sent the answer data including each answer content;

calculating, by the server, a total score per examinee identifier of the creating examinee who has sent the answer data, at least partly based on the score for each answer content stored in the answer data memory part in association with the answer data identifier and the examinee identifier of the creating examinee who has sent the answer data, and storing, by the server, the total score in an examinee evaluation data memory part in association with the examinee identifier of the creating examinee who has sent the answer data, provided that when calculating the total score, the score given to each answer content is weighted according to at least one of the following weighting criteria of (1) to (3):

(1) a plurality of the answer data for the same examinee identifier of the creating examinee being classified into each combination of the options and if there is a plurality of answer data identifiers of the answer data containing the same combination of the options, the score given to each answer content being weighted such that the answer content with a lower score obtains a lower weighting;

(2) for a plurality of the answer data for the same examinee identifier of the creating examinee, each of the combination of the options being quantified on a coordinate for calculation of its center point and the score given to each answer content being weighted such that the answer content including the combination of the options with a longer distance from the center point obtains a higher weighting; and (3) a total acquired score for each of all the combinations of the options assumed from the question content being calculated by summing up scores that are associated with the answer data identifier of the answer data including each combination of the options as the answer content and the score given to each answer content being weighted such that the answer content including the combination of the options with a lower total acquired score obtains a higher weighting;

ranking, by the server, each examinee based on the examinee identifier and the total score associated with the examinee identifier;

aggregating, by the server, the evaluation of the answer content per answer data identifier for calculating an adjusted score, provided that the evaluation associated with the examinee identifier with a higher rank is more highly weighted, and storing, by the server, the adjusted score in the answer data memory part in association with the answer data identifier;

calculating, by the server, an adjusted total score for each examinee based on the adjusted score given to each answer content and the examinee identifier stored in the answer data memory part, according to at least one of the weighting criteria; and extracting, by the server, an examinee evaluation data including the total score for each examinee stored in the examinee evaluation data memory part, and sending the examinee evaluation data to a corresponding examinee device through the network.

2. The method of the online test according to claim 1, further comprising:

generating, by the server, a visualization of distribution of human resources, the visualization including a graphical image representation of an idea distribution of each examinee versus that of other examinees in multidimensional space displayed on the corresponding examinee device.

3. The method of the online test according to claim 1, further comprising repeating at least once, by the server:

the ranking each examinee based on the examinee identifier and the total score associated with the examinee identifier, aggregating the evaluation of the answer content per answer data identifier for calculating the adjusted score, and storing the adjusted score in the answer data memory part in association with the answer data identifier; and the calculating the adjusted total score for each examinee based on the adjusted score given to each answer content and the examinee identifier stored in the answer data memory part, assigning the adjusted total score for each examinee as the total score for each examinee.

4. The method of the online test according to claim 1, further comprising:

comparing, by the server, the evaluation of each answer content associated with the examinee identifier of the evaluating examinee stored in the answer evaluation data memory part, with the non-adjusted or adjusted score given to the answer content stored in the answer data memory part, aggregating, by the server, an approximation between the evaluation and the non-adjusted or adjusted score per evaluating examinee for calculating, by the server, an evaluation accuracy of each evaluating examinee, and storing, by the server, the evaluation accuracy in the examinee evaluation data memory part in association with the examinee identifier of each examinee; and extracting, by the server, the examinee evaluation data including the evaluation accuracy of each evaluating examinee stored in the examinee evaluation data memory part, based on the evaluating, and sending, by the server, the examinee evaluation data of each evaluating examinee to a corresponding examinee device through the network.

5. The method of the online test according to claim 1, wherein each answer data includes a sample answer content by two or more sample examinees is stored in association with the answer data identifier of the answer data in the answer data memory part, and the method further comprising:

calculating, by the server, an average value A1 of the total scores for all the examinees including the sample examinees or not including the sample examinees, based on the total score or the adjusted total score if adjusted, for each examinee;

calculating, by the server, an average value A2 of the total scores for the sample examinees, based on the total scores or the adjusted total scores if adjusted;

calculating, by the server, a difference between A1 and A2;

subtracting, by the server, the difference between A1 and A2 from each of the total scores for the examinees such that the average value of the total scores for all the examinees is modified from A1 to A2 for obtaining a standardized total score for each examinee and storing, by the server, the standardized total score for each examinee in the examinee evaluation data memory part in association with the identifier of the examinee; and extracting, by the server, the examinee evaluation data including the total score for each examinee after standardization stored in the examinee evaluation data memory part based on the identifier of the examinee, and sending the examinee evaluation data to a corresponding examinee device through the network.

6. The method of the online test according to claim 1, wherein each answer data includes a sample answer content by two or more sample examinees is stored in association with each identifier of the answer data in the answer data memory part, and the method further comprising:

calculating, by the server, an average value A1 of the total scores for all the examinees including the sample examinees or not including the sample examinees, based on the total score or the adjusted total score if adjusted, for each examinee, calculating, by the server, a standard deviation D1 of the total scores for all the examinees including the sample examinees or not including the sample examinees, based on the total score or the adjusted total score, if adjusted, for each examinee;

calculating, by the server, a standard deviation D2 of the total scores for the sample examinees, based on the total scores or the adjusted total scores, if adjusted, for the sample examinees;

calculating, by the server, a ratio of D1 and D2;

multiplying, by the server, a difference between the total score for each examinee and the average value A1 by the ratio of D1 and D2 such that the standard deviation for all the examinees is modified from D1 to D2 for obtaining each multiplication value;

adding, by the server, the multiplication value to the average value A1 for obtaining a standardized total score for each examinee, and storing the standardized total score for each examinee in the examinee evaluation data memory part in association with the identifier of the examinee; and extracting, by the server, the examinee evaluation data including the standardized total score for each examinee stored in the examinee evaluation data memory part based on the identifier of the examinee, and sending the examinee evaluation data to a corresponding examinee device through the network.

7. An online test server for evaluating idea creation skills, the online test server comprising:

a transceiver, a timer, a random number generator;

memory comprising:

an examinee account data memory part configured to store each examinee account information in association with an examinee identifier;

a question data memory part configured to store a question data including a question content to choose a situation setting by combining at least two elements selected from a group of six elements including Who, What, Where, When, Why, and How (5W1H) provided that there is a plurality of options for each of the selected elements, and to describe an idea corresponding to the situation setting;

an answer data memory part configured to store an answer data including an answer content of the creating examinee to the question content received at the transceiver, in association with an answer data identifier of the answer data and the examinee identifier of the creating examinee who has sent the answer data;

an answer evaluation data memory part configured to store an answer evaluation data including an evaluation by an evaluating examinee of the answer content in the answer data received at the transceiver, in association with an answer evaluation data identifier of the answer evaluation data together with an examinee identifier of the evaluating examinee who has sent the answer evaluation data, the answer data identifier of the answer data that has been evaluated, and the examinee identifier of the creating examinee who has sent the answer data that has been evaluated; and an examinee evaluation data memory part configured to store a total score for the creating examinee in association with the examinee identifier; and a processor comprising:

(a) a data registration part configured to:

assign an identifier to the answer data received at the transceiver, if judged by the time limit judgement part that the answer data has been received within a time limit, and to store the answer data in the answer data memory part in association with the examinee identifier of the creating examinee who has sent the answer data, and assign an answer evaluation data identifier to the answer evaluation data received at the transceiver and to store the answer evaluation data in the answer evaluation data memory part in association with the examinee identifier of the examinee who has sent the answer evaluation data and the answer data identifier of the answer data that has been evaluated;

(b) a question extraction part configured to:

extract the question data from the question data memory part once the transceiver receives an instruction from an exam administrator device and to send the question data simultaneously to each examinee device through a network, and extract the question data from the question data memory part in accordance with an instruction of the time limit judgement part and to send the question data individually to a corresponding examinee device from the transceiver through the network;

(c) a time limit judgment part configured to:

use the timer to judge whether a receiving time of the answer data at the transceiver that has been sent from the examinee device is within or not within the time limit, based on a result of the judgement, when judging the receiving time is within the time limit, assign the answer data identifier to the answer data and to instruct to the data registration part to store the answer data in the answer data memory part in association with the examinee identifier of the creating examinee who has sent the answer data, and instruct the question extraction part to re-send the question data in a displayable form from the transceiver to the examinee device from which the answer data has been sent;

(d) an evaluator determination part configured to:

obtain a random number generated by the random number generator when the transceiver receives an instruction from the exam administrator device, and use the random number to determine the evaluating examinee who should evaluate the answer content in each answer data stored in the answer data memory part by associating the examinee identifier of the evaluating examinee with the answer data identifier;

(e) an answer extraction part configured to:

extract the answer data to be evaluated by the evaluating examinee based on the answer data identifier and the examinee identifier of the evaluating examinee associated with the answer data identifier of the answer data in accordance with a result of determining the evaluating examinee who should evaluate the answer content by the evaluator determination part, and send the answer data to a corresponding examinee device through the network;

(f) an answer evaluation part configured to:

aggregate the evaluation of the answer content per answer data identifier based on the evaluation by the evaluating examinee of the answer content and the answer data identifier stored in the answer evaluation data memory part for calculating a score for the answer content, and store the score in the answer data memory part in association with the answer data identifier;

(g) an examinee evaluation part configured to:

calculate a total score per examinee identifier of the creating examinee who has sent the answer data, at least partly based on the score for each answer content stored in the answer data memory part in association with the answer data identifier and the examinee identifier of creating the examinee who has sent the answer data, and store the total score in the examinee evaluation data memory part in association with the examinee identifier, provided that when calculating the total score, the score given to each answer content is weighted according to at least one of the following weighting criteria:

(1) a plurality of the answer data for the same examinee identifier of the creating examinee being classified into each combination of the options and if there is a plurality of answer data identifiers of the answer data containing the same combination of the options, the score given to each answer content being weighted such that the answer content with a lower score obtains a lower weighting;

(2) for a plurality of the answer data for the same examinee identifier of the creating examinee, each of the combination of the options being quantified on a coordinate for calculation of its center point, and the score given to each answer content being weighted such that the answer content including the combination of the options with a longer distance from the center point obtains a higher weighting; and (3) a total acquired score for each of all the combinations of the options assumed from the question content being calculated by summing up scores that are associated with the answer data identifier of the answer data including each combination of the options as the answer content, and the score given to each answer content being weighted such that the answer content including the combination of the options with a lower total acquired score obtains a higher weighting;

rank each examinee based on the examinee identifier and the total score associated with the examinee identifier;

aggregate the evaluation of the answer content per answer data identifier for calculating an adjusted score, provided that the evaluation associated with the examinee identifier with a higher rank is more highly weighted, and store the adjusted score in the answer data memory part in association with the answer data identifier;

calculate an adjusted total score per examinee identifier at least partially based on the adjusted score for the answer content stored in the answer data memory part in association with the answer data identifier, according to at least one of the weighting criteria; and (h) an examinee evaluation extraction part configured to:

extract the examinee evaluation data including the total score for each examinee stored in the examinee evaluation data memory part, and send the examinee evaluation data to a corresponding examinee device through the network.

8. The online test server according to claim 7, wherein the answer evaluation part is further configured to generate a visualization of distribution of human resources, the visualization including a graphical image representation of an idea distribution of each examinee versus that of other examinees in multidimensional space displayed on the corresponding examinee device.

9. The online test server according to claim 7, further comprising an evaluation accuracy calculation part configured to:

compare the evaluation of each answer content associated with the examinee identifier of the evaluating examinee stored in the answer evaluation data memory part, with the non-adjusted or adjusted score given to the answer content stored in the answer data memory part, aggregate an approximation between the evaluation and the non-adjusted or adjusted score per evaluating examinee for calculating an evaluation accuracy of each examinee, and store the evaluation accuracy in the examinee evaluation data memory part in association with the examinee identifier; and the examinee evaluation extraction part is further configured to:

extract the examinee evaluation data including the evaluation accuracy of each evaluating examinee stored in the examinee evaluation data memory part, based on the examinee identifier, and send the examinee evaluation data of each evaluating examinee to a corresponding examinee device through the network.

10. The online test server according to claim 7, wherein each answer data includes a sample answer content of two or more sample examinees is stored in association with the answer data identifier of the answer data in the answer data memory part, the online test server further comprises a score standardization part that is configured to:

calculate an average value A1 of the total scores for all the examinees including the sample examinees or not including the sample examinees, based on the total score or the adjusted total score if adjusted, for each examinee;

calculate an average value A2 of the total scores for the sample examinees, based on the total scores or the adjusted total scores if adjusted, for the sample examinees calculated by the examinee evaluation part;

calculate a difference between A1 and A2;

subtract the difference between A1 and A2 from each of the total scores for the examinees such that the average value of the total scores for all the examinees is modified from A1 to A2 for obtaining a standardized total score for each examinee, and to store the standardized total score for each examinee in the examinee evaluation data memory part in association with the identifier of the examinee; and the examinee evaluation extraction part is configured to:

extract the examinee evaluation data including the total score for each examinee after standardization stored in the examinee evaluation data memory part based on the identifier of the examinee, and send the examinee evaluation data to a corresponding examinee device through the network.

11. The online test server according to claim 7, wherein each answer data including an answer content of two or more sample examinees is stored in association with the identifier of the answer data in the answer data memory part, the online test server further comprises a score standardization part that is configured to:

calculate an average value A1 of the total scores for all the examinees including the sample examinees or not including the sample examinees, based on the total score or the adjusted total score, if adjusted, for each examinee;

calculate a standard deviation D1 of the total scores for all the examinees including the sample examinees or not including the sample examinees, based on the total score or the adjusted total score, if adjusted, for each examinee;

calculate a standard deviation D2 of the total scores for the sample examinees, based on the total scores or the adjusted total scores, if adjusted, for the sample examinees calculated by the examinee evaluation part;

calculate a ratio of D1 and D2;

multiply a difference between the total score for each examinee and the average value A1 by the ratio of D1 and D2 such that the standard deviation for all the examinees is modified from D1 to D2 for obtaining each multiplication value, to add the multiplication value to the average value A1 for obtaining a standardized total score for each examinee, and to store the standardized total score for each examinee in the examinee evaluation data memory part in association with the identifier of the examinee; and the examinee evaluation extraction part is configured to extract the examinee evaluation data including the standardized total score for each examinee stored in the examinee evaluation data memory part based on the identifier of the examinee, and to send the examinee evaluation data to a corresponding examinee device through the network.

12. A non-transitory computer readable-storage medium storing a program and including code for performing a process to be executed on a computer, the process comprising:

receiving, by a server, an instruction to start the online test from an exam administrator device through a network;

in response to the instruction to start the online test, extracting, by the server, a question data from a question data memory part, and sending, by the server, the question data to each examinee device through the network, wherein the question data includes a question content for each examinee to choose a situation setting by combining at least two elements selected from a group of six elements including Who, What, Where, When, Why, and How (5W1H) provided that there is a plurality of options for each of the selected elements, and to describe an idea corresponding to the situation setting;

receiving, by the server, an answer data including an answer content to the question content from each examinee device;

assigning, by the server, an answer data identifier to each of the answer data including the answer content received within a time limit predetermined by a timer and storing, by the server, the answer data in an answer data memory part in association with a examinee identifier of a creating examinee who has sent the answer data;

obtaining, by the server, a random number generated by a random number generator and using, by the server, the random number to determine an evaluating examinee who should evaluate the answer content in each of the answer data stored in the answer data memory part;

extracting, by the server, the answer data to be evaluated by the evaluating examinee from the answer data memory part in accordance with a result of determining the evaluating examinee who should evaluate the answer content and sending, by the server, the answer data to each examinee device of the evaluating examinee through the network;

receiving, by the server, the answer evaluation data including an evaluation by the evaluating examinee of the answer content in the answer data;

assigning, by the server, an answer evaluation data identifier to each of the received answer evaluation data and storing the answer evaluation data in an answer evaluation data memory part in association with an examinee identifier of the evaluating examinee who has sent the answer evaluation data, the answer evaluation data identifier of the answer data that has been evaluated, and the examinee identifier of the creating examinee who has sent the answer data that has been evaluated;

aggregating, by the server, the evaluation of the answer content in each answer data based on each answer evaluation data and the answer evaluation data identifier of the answer evaluation data stored in the answer evaluation data memory part, calculating, by the server, a score for each answer content, and storing, by the server, the score in the answer data memory part in association with the examinee identifier of the creating examinee who has sent the answer data including each answer content;

calculating, by the server, a total score per examinee identifier of the creating examinee who has sent the answer data, at least partly based on the score for each answer content stored in the answer data memory part in association with the answer data identifier and the examinee identifier, and storing, by the server, the total score in an examinee evaluation data memory part in association with the examinee identifier, provided that when calculating the total score, the score given to each answer content is weighted according to at least one of the following weighting criteria:

(1) a plurality of the answer data for the same examinee identifier of the creating examinee being classified into each combination of the options and if there is a plurality of answer data identifiers of the answer data containing the same combination of the options, the score given to each answer content being weighted such that the answer content with a lower score obtains a lower weighting;

(2) for a plurality of the answer data for the same examinee identifier of the creating examinee, each of the combination of the options being quantified on a coordinate for calculation of its center point and the score given to each answer content being weighted such that the answer content including the combination of the options with a longer distance from the center point obtains a higher weighting; and (3) a total acquired score for each of all the combinations of the options assumed from the question content being calculated by summing up scores that are associated with the answer data identifier of the answer data including each combination of the options as the answer content and the score given to each answer content being weighted such that the answer content including the combination of the options with a lower total acquired score obtains a higher weighting;

ranking, by the server, each examinee based on the examinee identifier and the total score associated with the examinee identifier;

aggregating, by the server, the evaluation of the answer content per answer data identifier for calculating an adjusted score, provided that the evaluation associated with the examinee identifier with a higher rank is more highly weighted, and storing, by the server, the adjusted score in the answer data memory part in association with the answer data identifier;

calculating, by the server, an adjusted total score for each examinee based on the adjusted score given to each answer content and the examinee identifier stored in the answer data memory part, according to at least one of the weighting criteria; and extracting, by the server, an examinee evaluation data including the total score for each examinee stored in the examinee evaluation data memory part, and sending the examinee evaluation data to a corresponding examinee device through the network.

13. The method of the online test according to claim 1, wherein each answer data includes a sample answer content by two or more sample examinees is stored in association with each answer data identifier of the answer data in the answer data memory part, and the method further comprising:

calculating, by the server, an average value A1 of the total scores for all the examinees including the sample examinees or not including the sample examinees, based on the total score or the adjusted total score if adjusted, for each examinee;

calculating, by the server, an average value A2 of the total scores for the sample examinees, based on the total scores or the adjusted total scores if adjusted, for the sample examinees;

calculating, by the server, a standard deviation D1 of the total scores for all the examinees including the sample examinees or not including the sample examinees, based on the total score or the adjusted total score if adjusted, for each examinee;

calculating, by the server, a standard deviation D2 of the total scores for the sample examinees, based on the total scores or the adjusted total scores if adjusted, for the sample examinees;

calculating, by the server, a ratio of D1 and D2;

multiplying, by the server, a difference between the total score for each examinee and the average value A1 by the ratio of D1 and D2 such that the standard deviation for all the examinees is modified from D1 to D2 for obtaining each multiplication value;

adding, by the server, the multiplication value to the average value A2 for obtaining a standardized total score for each examinee and storing the standardized total score for each examinee in the examinee evaluation data memory part in association with the identifier of the examinee; and extracting, by the server, the examinee evaluation data including the standardized total score for each examinee stored in the examinee evaluation data memory part based on the identifier of the examinee and sending the examinee evaluation data to a corresponding examinee device through the network.

14. The online test server according to claim 7, wherein each answer data includes a sample answer content of two or more sample examinees is stored in association with the answer data identifier of the answer data in the answer data memory part, and the online test server further comprises:

a score standardization part configured to:

calculate an average value A1 of the total scores for all the examinees including the sample examinees or not including the sample examinees, based on the total score or the adjusted total score if adjusted, for each examinee;

calculate an average value A2 of the total scores for the sample examinees, based on the total scores or the adjusted total scores if adjusted, for the sample examinees calculated by the examinee evaluation part;

calculate a standard deviation D1 of the total scores for all the examinees including the sample examinees or not including the sample examinees, based on the total score or the adjusted total score if adjusted, for each examinee;

calculate a standard deviation D2 of the total scores for the sample examinees, based on the total scores or the adjusted total scores if adjusted, for the sample examinees calculated by the examinee evaluation part;

calculate a ratio of D1 and D2;

multiply a difference between the total score for each examinee and the average value A1 by the ratio of D1 and D2 such that the standard deviation for all the examinees is modified from D1 to D2 for obtaining each multiplication value, add the multiplication value to the average value A2 for obtaining a standardized total score for each examinee, and store the standardized total score for each examinee in the examinee evaluation data memory part in association with the identifier of the examinee; and the examinee evaluation extraction part configured to:

extract the examinee evaluation data including the standardized total score for each examinee stored in the examinee evaluation data memory part based on the identifier of the examinee, and send the examinee evaluation data to a corresponding examinee device through the network.

* * * * *